(12) United States Patent
Brechemier et al.

(10) Patent No.: US 8,209,046 B2
(45) Date of Patent: Jun. 26, 2012

(54) DEVICE AND A METHOD FOR PREPARING AN OPHTHALMIC LENS FOR MACHINING

(75) Inventors: Bernard Brechemier, Charenton le Pont (FR); Stéphane Boutinon, Charenton le Pont (FR); Konogan Baranton, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 277 days.

(21) Appl. No.: 12/596,370

(22) PCT Filed: Mar. 21, 2008

(86) PCT No.: PCT/FR2008/000387
§ 371 (c)(1),
(2), (4) Date: Apr. 16, 2010

(87) PCT Pub. No.: WO2008/142227
PCT Pub. Date: Nov. 27, 2008

(65) Prior Publication Data
US 2010/0228375 A1    Sep. 9, 2010

(30) Foreign Application Priority Data
Apr. 18, 2007 (FR) ...................................... 07 02799

(51) Int. Cl.
*G06F 19/00* (2011.01)
*G02C 13/00* (2006.01)
(52) U.S. Cl. ........................................ 700/117; 351/177
(58) Field of Classification Search .................. 700/117; 351/177, 178; 451/5, 8, 42; 356/124, 127
See application file for complete search history.

(56) References Cited

U.S. PATENT DOCUMENTS

| 5,648,025 | A | * | 7/1997 | Cook et al. | 264/1.36 |
| 5,919,080 | A | * | 7/1999 | Savoie et al. | 451/5 |
| 6,012,965 | A | * | 1/2000 | Savoie | 451/6 |
| 6,056,633 | A | * | 5/2000 | Sesena et al. | 451/384 |

(Continued)

FOREIGN PATENT DOCUMENTS
WO    2006/058985    6/2006
(Continued)

OTHER PUBLICATIONS

International Search Report dated Nov. 26, 2008, from corresponding PCT application.

*Primary Examiner* — Dave Robertson
(74) *Attorney, Agent, or Firm* — Young & Thompson

(57) ABSTRACT

A preparation device (1) for preparing an ophthalmic lens to be machined, includes a support (100) suitable for holding the ophthalmic lens, blocking elements (400) including at least one blocking accessory (450) and a manipulator arm (401) for manipulating the blocking accessory, an acquisition device (200) suitable for acquiring an image of the ophthalmic lens, electronic and/or computer processor elements (700) suitable firstly for deducing an optical frame of reference of the ophthalmic lens, and secondly for controlling the position of the manipulator arm and/or of the support to apply the blocking accessory against the ophthalmic lens in a given blocking position. The blocking elements and/or the support include at least one marker element and the electronic and/or computer processor elements are adapted to identify the position of the marker element in an image acquired by the acquisition device, in which image there appears an image of the marker element.

30 Claims, 6 Drawing Sheets

U.S. PATENT DOCUMENTS

| | | | |
|---|---|---|---|
| 6,568,990 B2 * | 5/2003 | Siders et al. | 451/5 |
| 6,942,746 B2 * | 9/2005 | Niejelow et al. | 156/154 |
| 7,646,475 B2 * | 1/2010 | Divo | 356/124 |
| 7,661,819 B2 * | 2/2010 | Mazoyer | 351/178 |
| 7,734,366 B2 * | 6/2010 | Iribarne | 700/117 |
| 7,828,624 B2 * | 11/2010 | Siders et al. | 451/5 |
| 7,846,009 B2 * | 12/2010 | Mazoyer | 451/8 |
| 7,876,428 B2 * | 1/2011 | Divo | 356/124 |
| 2007/0291258 A1 | 12/2007 | Divo | |

FOREIGN PATENT DOCUMENTS

WO 2006/117443 11/2006

* cited by examiner

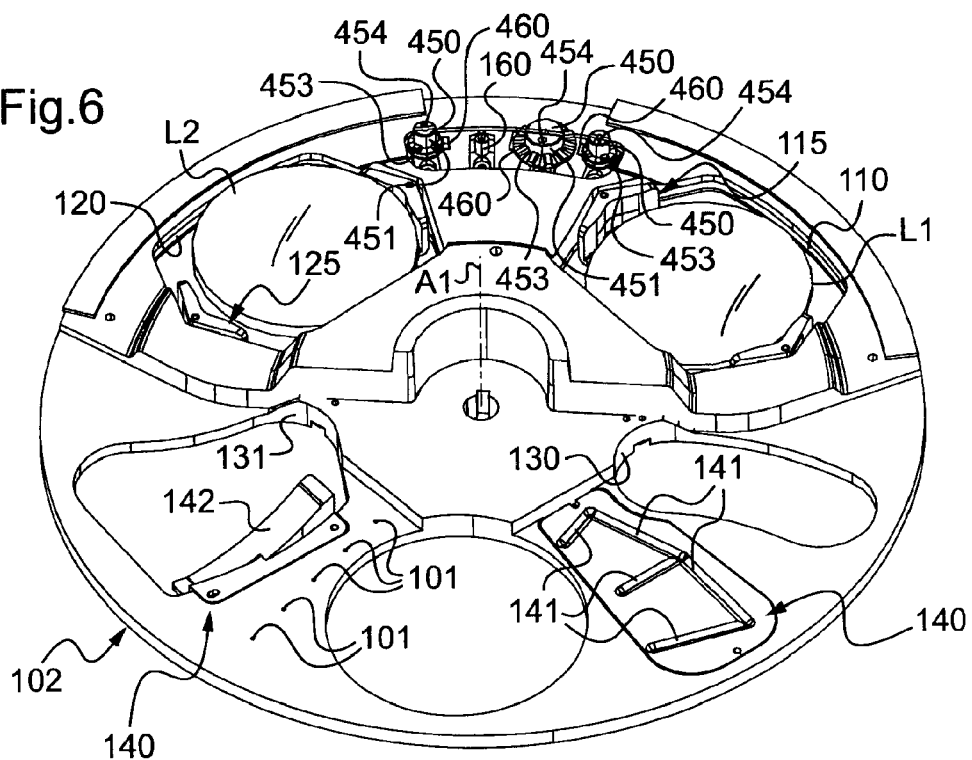
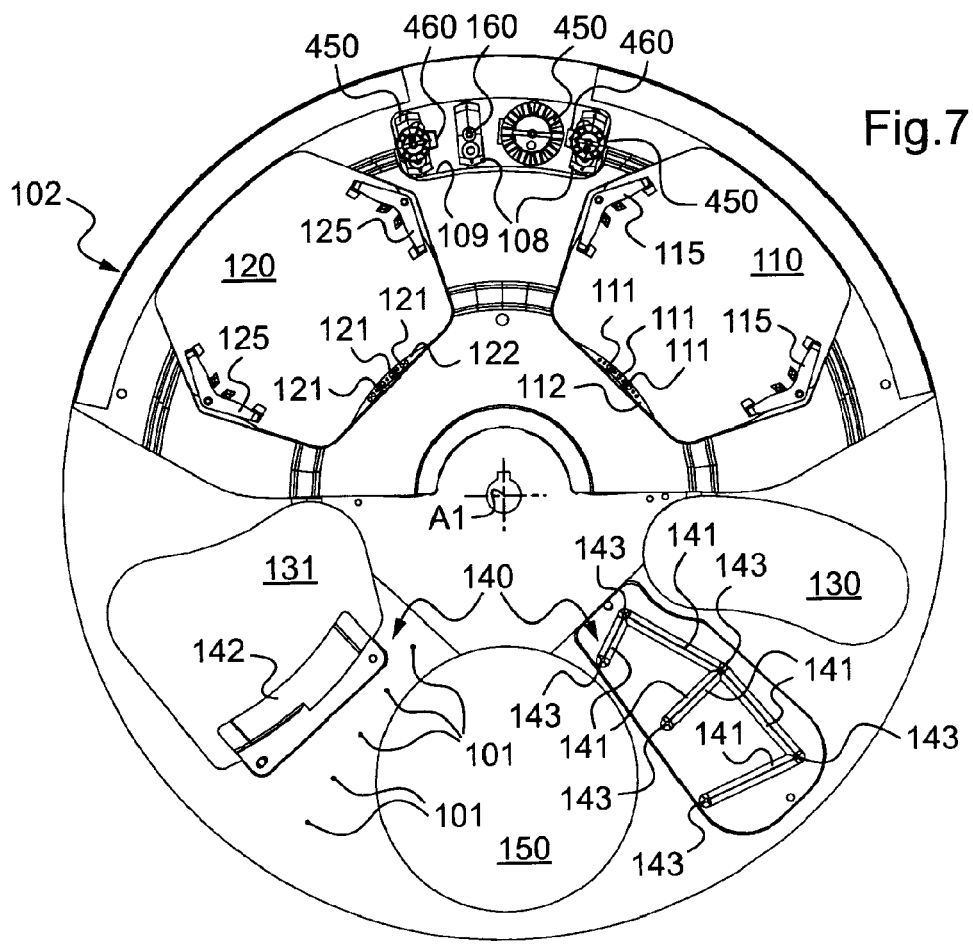

DEVICE AND A METHOD FOR PREPARING AN OPHTHALMIC LENS FOR MACHINING

TECHNICAL FIELD TO WHICH THE INVENTION RELATES AND TECHNOLOGICAL BACKGROUND

The present invention relates in general to the field of eyeglasses and more particularly to preparing an ophthalmic lens for shaping by edging.

More particularly, the invention relates to a device for preparing an ophthalmic lens for machining, the device comprising:
- a support suitable for holding said ophthalmic lens;
- blocking means including at least one blocking accessory and a manipulator arm for manipulating said blocking accessory;
- an acquisition device suitable for acquiring an image of the ophthalmic lens held by the support; and
- electronic and/or computer processor means suitable firstly for deducing an optical frame of reference of the ophthalmic lens from the image acquired by the acquisition device, and secondly for controlling the position of the manipulator arm and/or of the support to apply said blocking accessory against the ophthalmic lens in a given blocking position that depends on the deduced optical frame of reference.

The invention also provides a method of preparing an ophthalmic lens by means of such a preparation device.

The technical part of the profession of an optician consists in mounting a pair of ophthalmic lenses that are ready for shaping in a frame selected by a wearer. Such mounting comprises three main operations:
- acquiring the shape of the bezel of each of the two rims of the eyeglass frame if the frame is of the rimmed type (i.e. acquiring the shapes of the grooves that run around the inside of each rim of the frame); or acquiring the shape of a presentation lens or of a template if the frame is of the half-rimmed or pierced type;
- centering each lens, which consists in determining the position that each lens is to occupy in the frame so as to be suitably centered in register with the pupil of the wearer's eye so as to perform appropriately the optical function for which it is designed; and
- shaping each lens, which consists in machining or cutting out its outline to the shape that is desired, given firstly the shape that has been acquired from the bezel or the presentation lens or the template, and secondly the defined centering parameters.

The present invention relates more particularly to the second operation that is known as "centering". Specifically, the optician needs to define the position that is to be occupied by the final outline to which the lens is to be shaped relative to the optical frame of reference of said lens (typically, its usual marks or its optical centering point), so that once the lens has been assembled with the frame, it is suitably positioned in register with the pupil of the wearer's eye.

To do this, the optician begins by taking measurements from the wearer and the frame selected by the wearer in order to determine in particular the positions of the wearer's eyes relative to the frame, and thus relative to the final outline.

Then, in a second stage, the optician places the lenses on a lens support provided on a preparation device of the type defined in the introduction. The acquisition device of that preparation device then acts on each lens to determine the position of its optical centering point for positioning in register with the pupil of one of the eyes of the wearer.

In a third stage, the electronic and/or computer processor means of the preparation device deduce the position of the final outline on each lens for shaping as a function of the positions determined for the centering points and of the measured positions of the pupils of the wearer's eyes relative to the final outline. Depending on the position of the final outline on each lens, the processor means act for each lens to define both a blocking point and a blocking axis (situated in the mean plane of the lens).

Finally, during a last stage, a blocking accessory of the preparation device is stuck onto each lens at its blocking point, and in an orientation that is a function of the determined blocking axis. In this way, each lens can subsequently be extracted from the preparation device and then placed in a shaper device, with the frames of reference of the lenses being conserved by the positions of the blocking accessories on the lenses. The blocking accessories are stuck automatically in place by means of the manipulator arm, which is adapted to move relative to the ophthalmic lens support.

Nevertheless, the Applicant has found that in spite of the care given to making and assembling the structural and optical elements of the preparation device, once the ophthalmic lenses have been shaped, it can happen that they are not properly centered on the axes of the wearer's eyes, which can lead to visual discomfort for the wearer.

SUMMARY OF THE INVENTION

In order to improve the accuracy with which ophthalmic lenses are centered, the present invention proposes a preparation device as defined in the introduction, wherein the blocking means and/or the support include at least one marker element, and wherein the electronic and/or computer processor means are adapted to identify the position of the marker element in an image acquired by the acquisition device, which image has an image of said marker element appearing therein.

The manipulator arm and/or the support have freedoms of movement in translation and/or in rotation in order to enable the blocking accessory to be placed on the lens in an accurate position. These freedoms of movement are provided by means of electric stepper motors controlled by the processor means. These motors thus serve not only to actuate the support and/or the manipulator arm, but also to provide the processor means with the assumed position of the arm and/of the support.

In investigations carried out by the Applicant, it has been found that when the support and/or the manipulator arm is caused to move quickly, stepper motors are not capable of determining the exact number of steps performed. Such "step loss" then gives rise to a loss of the frame of reference of the support and/or the manipulator arm, and that is harmful to the accuracy with which the blocking accessory is placed on the lens and thus to the accuracy with which said lens is centered.

Furthermore, even at moderate speed, such motors generally provide data that is very slightly erroneous. These errors are due to the way in which such motors are designed and they tend to become worse over time. They are referred to as "drift" errors.

Finally, inaccuracies while making and assembling the parts of the preparation device, and the ways in which these parts vary over time (wear, impacts, temperature variations, . . . ) all contribute to reducing the accuracy with which the blocking accessory is placed on the lens.

The term "marker element" is used to mean an element that is visible in an image taken by the acquisition device and that is identifiable by the electronic and/or computer processor means.

Thus, by means of the invention, the processor means can identify the position of the support and/or of the manipulator arm in order to deduce the difference between the real position and a setpoint position for the manipulator arm relative to the support. Taking this difference into account then makes it possible to ensure that the ophthalmic lens is correctly centered.

According to a first advantageous characteristic of the invention, the processor means are adapted to determine the real position of the manipulator arm and/or the position of the support as a function of the identified position of the marker element.

Advantageously, the electronic and/or computer processor means are adapted firstly to identify a difference between said real position and a setpoint position for the manipulator arm relative to the support, and secondly to prepare for machining of the ophthalmic lens by generating a signal that includes data relating to said identified difference, the preparation device including communications means for communicating with a machining device and suitable for conveying said signal.

The blocking accessory is thus placed on the lens without taking account of the identified difference. Nevertheless, this difference is transmitted to the device for machining the lens so that it shapes the lens while taking account of the difference.

In a variant, the processor means are adapted to control the position of the manipulator arm and/or of the support to apply said blocking accessory on the ophthalmic lens by means of a control loop that, at each instant, is a function of the identified position of the marker element.

According to another advantageous characteristic of the invention, the electronic and/or computer processor means are adapted firstly to identify a difference between said real position and a setpoint position for the manipulator arm, and/or for the support, and secondly to control the position of the manipulator arm and/or of the support as a function of said identified difference.

Controlling the position of the manipulator arm relative to the support as a function of the identified difference makes it possible to ensure that the blocking accessory is correctly positioned on the lens, and consequently that the ophthalmic lens is correctly centered.

More precisely, if the support is stationary relative to the acquisition device, the marker element is situated on the manipulator arm and it enables the blocking accessory to be accurately positioned on the lens.

Otherwise, if the support is movable relative to the acquisition device, and if the manipulator arm is adapted to move in translation only towards the lens for putting the blocking accessory into place, then the marker element is situated on the support and it enables the lens to be positioned accurately under the blocking accessory.

According to another advantageous characteristic of the invention, both the blocking means and the support are movable, and are controlled in position by the electronic and/or computer processor means, each of them including at least one marker element.

In general, the lens support comprises a carousel provided with freedom of movement in pivoting about an axis of rotation in order to position each lens in succession in register with the acquisition device and then with the manipulator arm. The manipulator arm has two freedoms of movement, freedom of movement in pivoting that, in association with the pivoting of the carousel, enables the blocking accessory to be placed in register with the blocking point of the lens, and freedom of movement in translation for placing the blocking accessory on the lens. The manipulator arm also has a third freedom of movement that enables the blocking accessory to be pivoted so as to orient it appropriately relative to the blocking axis of the lens. Thus, the carousel (the support) and the manipulator arm are both movable relative to the acquisition device.

The acquisition device then makes it possible to acquire images of the marker element, and the processor means enable their relative positions to be identified in the frame of reference of the acquisition device. Step losses and drift errors of the motors are then easily corrected by the processor means, thus ensuring accurate positioning of the blocking accessory relative to the lens.

According to another advantageous characteristic of the invention, the acquisition device is suitable for acquiring an image of at least a portion of the manipulator arm, and the manipulator arm includes at least three marker elements positioned relative to one another in such a manner that the images of at least two marker elements appear in said acquired image.

In general, the manipulator arm comprises an elongate body having a reception head at the end thereof for receiving a blocking accessory. The above-mentioned third freedom of movement of the manipulator arm thus corresponds to movement of the reception head relative to the elongate arm in pivoting about an axis that is substantially parallel to the axis of the lens. However, the marker elements of the manipulator arm are disposed on the reception head. Depending on the orientation of the reception head relative to the elongate body, it can then happen that one of the marker elements is hidden by the elongate body. Under such circumstances, the use of three marker elements makes it possible to ensure that two marker elements are always visible to the acquisition device. The exact positions of these two marker elements then enables the position of the reception head to be determined.

Naturally, the three marker elements may be formed by three distinct openings, however they could also be formed by a single opening of large size presenting three zones of characteristic shapes, of positions that can easily be identified by the processor means.

Advantageously, the support is movable relative to a base structure and is provided with a marker element of the above-specified type, and the acquisition device is suitable for acquiring in succession, for two distinct positions of the support, two images of at least a portion of the support and of said marker element, and the electronic and/or computer processor means are suitable for deducing the position of the support relative to the base structure from the two successive positions of said marker element.

The support, which is formed by the carousel, is movable about the axis of rotation. The use of a marker element thus enables the processor means to determine the position of the center of rotation of the support from the two images acquired by the acquisition device.

In a variant, the support is movable relative to a base structure and is provided with two marker elements of the above-specified type, and the acquisition device is suitable for acquiring an image of at least a portion of the support and of said marker element, and the electronic and/or computer processor means are suitable for deducing the position of the support relative to the base structure from the positions of said marker elements.

In this variant, the positions of the two marker elements acquired in a single image enable the processor means to determine the position of the center of rotation of the support.

Preferably, the manipulator arm and/or the support include at least two marker elements presenting distinct geometrical shapes.

Consequently, the two marker elements are distinguished in the image acquired by the acquisition device and can be distinguished by the electronic and/or computer processor means.

Consider the two marker elements of the reception head of the manipulator arm. If their images were identical in shape, then the processor means could not determine which image corresponds to which marker element. As a result, the processor means would need to envisage two distinct angular positions of the reception head relative to the elongate body, said positions being spaced apart angularly by 180 degrees. There, the processor means can determine which one of these two positions is actually presented by the reception head.

According to another advantageous characteristic of the invention, the blocking accessory is provided with said marker element and the electronic and/or computer processor means are suitable firstly for detecting the presence or the absence of said marker element as a function of the image acquired by the acquisition device, and secondly for deducing therefrom the presence or the absence of said blocking accessory on the manipulator arm.

The manipulator arm is adapted to take hold automatically of a blocking accessory previously placed on the support by the optician. It can happen that the blocking accessory is incorrectly placed on the support or that it has moved during a movement of the support. The manipulator arm can then no longer take hold of it automatically. With this characteristic, the processor means can verify that the accessory has indeed been taken. If not, the processor means can, for example, control the position of the manipulator arm so that it can try again to take hold of the same blocking accessory or of another blocking accessory.

Preferably, the support includes a plurality of reception locations for receiving ophthalmic lenses, each of which is associated with a marker element of the above-specified type, the support and the acquisition device being movable relative to each other to position each reception location in succession in a position for processing by the acquisition device, in which position said marker element associated with said reception location appears in the image acquired by the acquisition device.

Prior to the blocking accessory being placed on the lens, the processor means proceed with a plurality of successive operations. Initially, they control the position of the support so as to position the lens in register with the acquisition device in order to determine the optical frame of reference of the lens. Thereafter, they control both the support so that it moves away from under the acquisition device and the manipulator arm so as to place it facing the acquisition device in order to acquire the exact position of the arm. Thereafter the processor means cause the support to return to the initial centering position, and finally they cause the arm to move relative to the support so as to place the blocking accessory on the lens. This go-and-return movement of the support can give rise to step losses in the motor driving it. The marker element situated in the reception location then makes it possible to determine the difference between the positions of the support before and after these go-and-return movements, thus making it possible to correct the position of the support so as to position the blocking point of the lens correctly in register with the blocking accessory.

Preferably, there is provided a loading zone that is accessible to a user and that is provided with at least one seat for supporting an ophthalmic lens while it is being loaded into or unloaded from one of the reception locations, each reception location presenting a recess and each seat carrying a polarized coating or illumination visible to the user through the recess in the corresponding reception location.

The acquisition device includes a light source that illuminates the lens and that is generally polarized. If the lens is also polarized, then the angular position of the lens relative to the light source modifies the brightness of the lens seen by the image capture means. In particular, there exists a position of the lens in which said image is completely dark, making it impossible for it to be processed by the processor means.

The polarized coating or illumination thus enables the user (the optician) to place the lens on the support in a suitable orientation, in an angular position prescribed by the manufacturer of the preparation device. In this way, when the lens is in position for processing by the acquisition device, the polarization directions of the light source and of the lens are substantially parallel, such that the image seen by the image capture means is very bright.

In addition, since the polarization direction of the lens is known, the preparation device can optionally center and block the lens while taking this polarization direction into account, such that once assembled in the eyeglass frame selected by the client, the lens is polarized horizontally.

According to another advantageous characteristic of the invention, the support includes an updating opening and the electronic and/or computer processor means are suitable for controlling the support to take up a rest position in which the reception locations are situated in a loading zone accessible to a user, and in which position the updating opening is in position for being processed by the acquisition device.

Thus, while the preparation device is not in use, the updating opening remains in position in register with the acquisition device. Consequently, the image capture means of the acquisition device can continually see the image displayed by the imaging means, without the image being deformed by a lens.

The source image is made up of a pattern of points occupying positions that vary unintentionally over time. Because of this updating opening, while the device is not in use, the shape of the pattern is regularly acquired so that when centering a lens the image of the pattern as deformed by the lens can be compared with an image of the non-deformed pattern as recently updated and stored by the processor means.

Advantageously, each reception location of the support is adjacent to a calibration opening passing through the support, while the electronic and/or computer processor means are adapted firstly to control the manipulator arm relative to the support so as to place said calibration opening and the manipulator arm in a position for processing by the acquisition device, and secondly to determine the position of each marker element of the manipulator arm as a function of the image acquired by the acquisition device.

In order to place the blocking accessory on the lens, the processor means cause the support to move back and forth in order to center the lens and to verify the position of the manipulator arm. The calibration opening then enables the support to retract in such a manner that the manipulator arm can be seen by the image capture means. Furthermore, the fact that each reception location is adjacent to a calibration opening makes it possible to reduce the length of time needed for the go-and-return movement of the support.

According to another advantageous characteristic of the invention, the support is provided with said marker element, at least one feeler means is provided for feeling the ophthalmic lens held by the support, and the electronic and/or computer processor means are adapted to control the position of the feeler arm relative to the support as a function of the determined position of said marker element of the support.

In general, such a preparation device has two feeler arms, one for feeling the convex front face of the lens and the other for feeling its concave rear face. These two feeler arms are mounted on the base structure that supports the lens support. The positions of the arms relative to the base structure are generally previously calibrated so the marker elements of the support then enable the support to be positioned accurately relative to the base structure and thus relative to the feeler arms.

According to another advantageous characteristic of the invention, at least one feeler arm is provided for feeling the ophthalmic lens, the support includes permanent calibration paths, and the electronic and/or computer processor means are suitable firstly for controlling the position of the feeler arm relative to the support to cause it to feel said calibration paths, and secondly to deduce from said feeling parameters for calibrating the relative position of the feeler arm.

At present, the position of each feeler arm relative to the support is calibrated by means of a master gauge of shape that is accurately known. In accordance with this characteristic, the expensive and time-consuming use of a master gauge becomes obsolete, since the support itself carries the calibration means.

According to another advantageous characteristic of the invention, at least one of the calibration paths is provided with a marker element of the above-specified type, while the electronic and/or computer processor means are suitable firstly for controlling the support to position said calibration path in a position for processing by the acquisition device, and secondly for deducing at least some of said calibration parameters from the image acquired by the acquisition device.

In accordance with this characteristic, the marker elements are openings that are visible in the image acquired by the acquisition device and identifiable by feeling with the feeler arm. The processor means can then match the information obtained by the acquisition device with the information obtained by the feeler arm in order to calculate suitable calibration parameters.

Advantageously, the support presents freedom of movement in pivoting about an axis of rotation, and said calibration paths comprise at least two non-parallel rectilinear grooves situated in a plane orthogonal to said axis of rotation and a plane that slopes relative to said axis of rotation.

In accordance with this characteristic, the feeler arm has freedom of movement in rotation relative to the base structure about an axis parallel to the axis of rotation of the support, and freedom of movement in translation, likewise parallel to said axis. As a result, in order to position the end of the feeler arm in register with a determined point of the lens held by the support, it is necessary to control the rotations of the feeler arm and of the support simultaneously.

Since the position of the center of rotation of the support is known, feeling two non-parallel grooves makes it possible to determine the position of the center of rotation of the feeler arm in the plane of the support.

In a variant, it is possible to provide two pairs of grooves situated at different altitudes. In this way, knowing the position of the axis of rotation of the support, feeling the two pairs of grooves makes it possible to determine the position of the axis of rotation of the feeler arm relative to the position of the axis of rotation of the support.

The inclined plane serves to calibrate the freedom of the feeler arm to move in translation. In particular, if the device has two feeler arms for placing on opposite sides of the lens in order to feel it, feeling the top and bottom faces of the sloping plane serves to calibrate the distance between the ends of the two feeler arms.

Advantageously, the electronic and/or computer processor means are suitable for:
  detecting one or more zones of conflict on the ophthalmic lens held by the support, in each of which zones there is a risk of the feeler arm coming into conflict against a member of the support;
  controlling the position of the feeler arm relative to the support to feel at least one optical face of said ophthalmic lens except in said zone of conflict, the feeler arm being controlled in position in a mean plane of the ophthalmic lens to follow a predetermined outline in said mean plane while also being simultaneously urged against said optical face of the ophthalmic lens in a direction extending substantially transversely relative to said mean plane;
  acquiring the coordinates of a plurality of points of the predetermined outline that do not lie in said zone of conflict; and
  calculating the coordinates of a plurality of points of the predetermined outline that lie within said zone of conflict, while taking account at least of the shape of the predetermined outline in the mean plane and of the coordinates of points felt on said optical face of the ophthalmic lens.

Acquiring the shape of the rims of the frame that are to receive the ophthalmic lenses being prepared (or acquiring the shape of a presentation lens or of a template) enables the electronic and/or computer processor means to provide data relating to the shape of a predetermined outline that should be imparted when shaping each lens. As a function of this shape and of the calculated centering parameters, the feeler arm attempts to feel the optical face of the lens held by the support along a three-dimensional outline that has a shape, when projected onto the mean plane of the lens, that is identical to the shape of the predetermined outline.

During this feeling, it can happen that the lens support, in general the jaws that hold the lens, lies on the path of the feeler arm. Consequently, the processor means cannot acquire all of the data characterizing the three-dimensional outline.

In accordance with this characteristic, in order to avoid the feeler arm coming into abutment against the jaws holding the lens and thus breaking, the processor means detect zones of conflict on the lens into which the feeler arm must not penetrate. In order to feel the three-dimensional outline, the processor means can then either control the arm so that it is raised in the zones of conflict, or else it can control it in such a manner that it goes round the zone. Thereafter, the processor means use interpolation to determine the shape of the three-dimensional outline in the zones that have not been felt. This interpolation is performed on the basis of the shape of the predetermined outline and the shape of the optical face of the lens. The shape of this optical face, which is generally spherical or cylindrical, can be approximated from the coordinates of a plurality of points that have been felt on the lens.

Advantageously, said blocking accessory is manipulated by the manipulator arm and presents a contact face suitable for pressing against the ophthalmic lens held by the support, and the manipulator arm comprises an elongate body and a reception head for receiving the blocking accessory, said reception head being connected to the elongate body via a ball joint presenting one freedom of movement in rotation under the control of the electronic and/or computer processor means and two unconstrained freedoms of movement in rotation about a pivot point situated on said contact face.

The curvature of the lens, and in particular the mean radius of curvature of its convex front face, depends essentially on its optical powers. In order to present high optical powers, the front face of a lens consequently needs to present a mean radius of curvature that is small. However the blocking accessory is not necessarily placed in the center of the lens, but may be offset over the front face. In accordance with this characteristic, the two unconstrained freedoms of movement in rotation enable the blocking accessory to tilt so that its entire contact face is applied to the lens.

When the blocking accessory pivots without constraint to become appropriately oriented relative to the front face of the lens, it is appropriate to avoid such pivoting shifting the accessory away from the blocking point of the lens, since that would give rise to centering errors. The position of the pivot point makes it possible to ensure that when the blocking accessory pivots about the pivot point, the center of its contact face remains centered relative to the manipulator arm, and thus relative to the blocking point of the lens.

It is then advantageous for the reception head to include a conical bore diverging towards its mouth and for each blocking accessory to include a converging conical base engageable in the diverging conical bore of the reception head.

When the blocking accessory has been placed on the lens and the manipulator arm moves back up, the blocking accessory needs to disengage from the arm without force in order to avoid the blocking accessory moving over the front face of the lens. If the blocking accessory is inclined, the conical shape of its base avoids the base rubbing against the bore in the reception head of the manipulator arm while the arm is rising.

The invention also provides a preparation method comprising the steps of:

a) controlling the support to place one of the reception locations in position for processing by the acquisition device; then b) acquiring a first image of the ophthalmic lens held in said reception location and of the marker element of said reception location;

c) controlling the positions of the manipulator arm and of the support to place the calibration opening adjacent to said reception location and the manipulator arm in a position for being processed by the acquisition device; then d) acquiring an image of the manipulator arm and of the marker element of said manipulator arm;

e) identifying a difference between a setpoint position for the manipulator arm and its real position as deduced from the position of the image acquired of the marker element of the manipulator arm;

f) controlling the position of the support to bring said reception location into a position for being processed by the acquisition device;

g) acquiring a second image of the ophthalmic lens held in said reception location and of the marker element of said reception location;

h) identifying a difference between a setpoint position for the support and its real position deduced from the positions of the first and second images acquired of the marker element of said reception location; and finally i) controlling the manipulator arm to move towards the support to apply said blocking accessory against the ophthalmic lens.

DETAILED DESCRIPTION OF AN EMBODIMENT

The description below with reference to the accompanying drawings of an embodiment given by way of non-limiting example makes it clear what the invention consists in and how it can be reduced to practice.

IN THE ACCOMPANYING DRAWINGS

FIGS. 6 and 7 are a perspective view and a plan view of the FIG. 2 support;

Device

Figure 1:
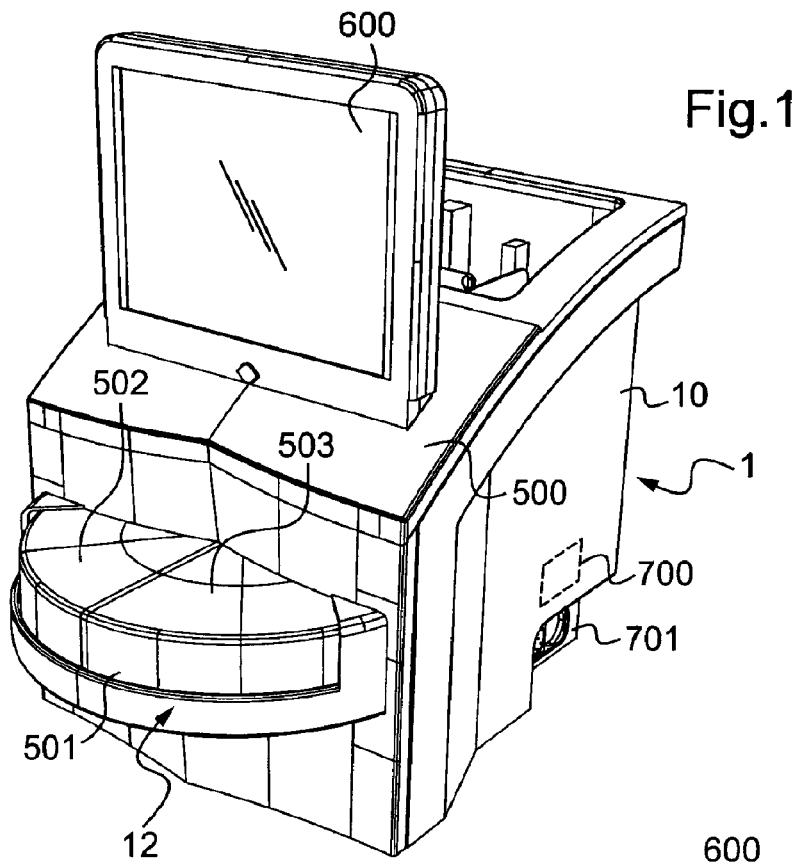
FIG. 1 is an overall perspective view of the outside of an ophthalmic lens preparation device of the invention, the device being provided with a hood.
Figure 2:
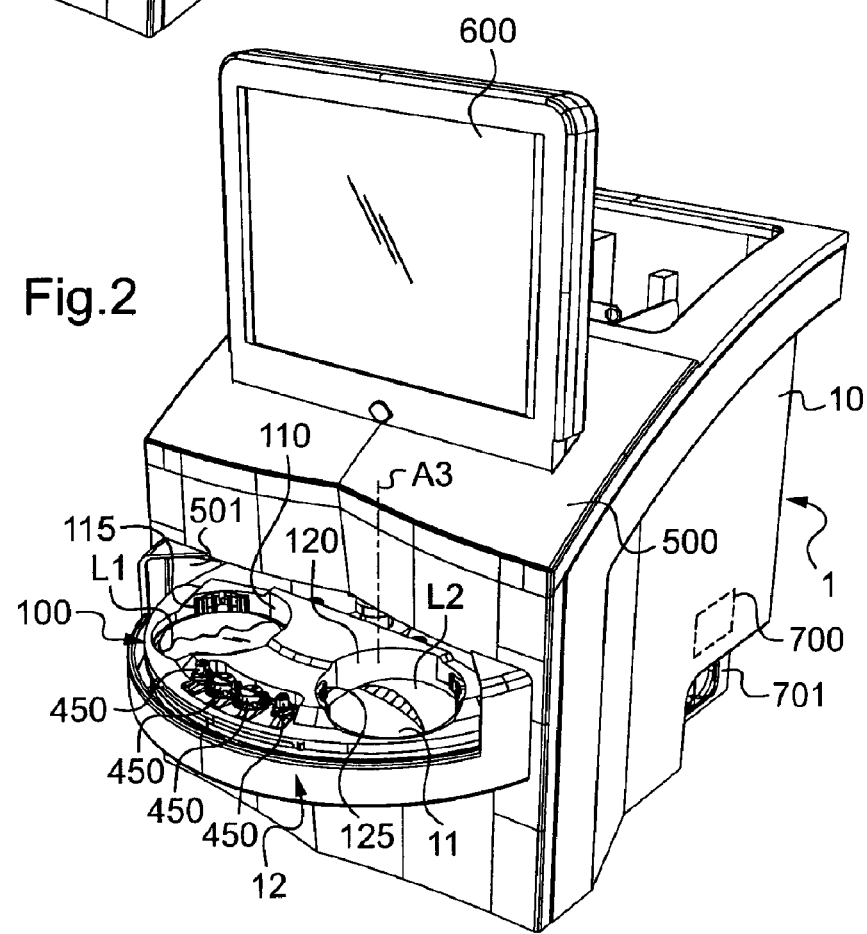
FIG. 2 is a view similar to FIG. 1, with an access door of the hood being open to enable a pair of ophthalmic lenses and blocking accessories to be loaded on and/or unloaded from a support of the device.
Figure 4:
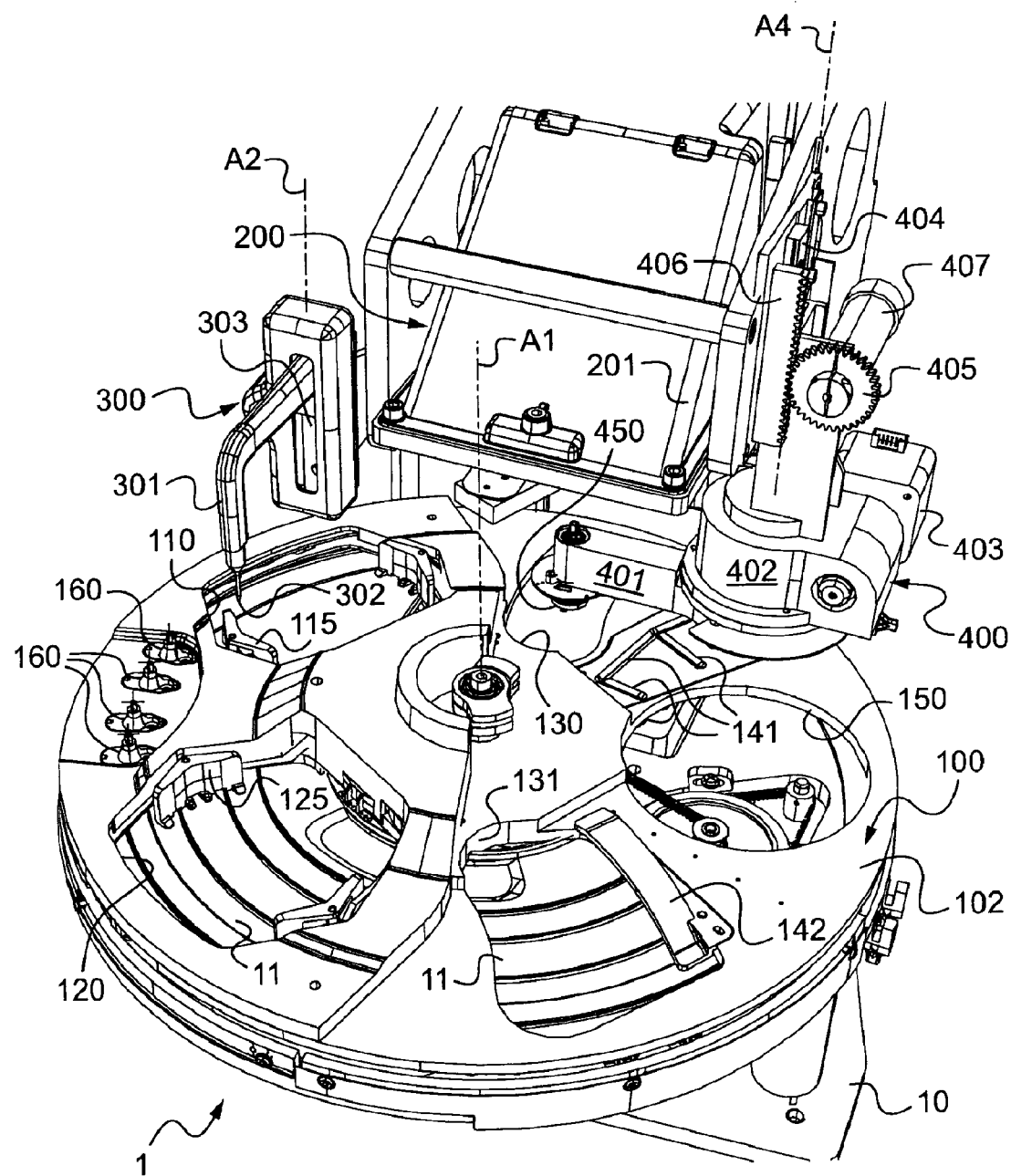
FIG. 4 is a perspective view of the inside of the FIG. 1 preparation device fitted with its support, with an image acquisition device, and with a manipulator arm, and shown in a configuration of the support and of the manipulator arm in which the acquisition device can monitor the position of the manipulator arm.

The preparation device 1 shown in FIGS. 1, 2, and 4 comprises a plurality of members mounted on a common base structure 10, and including:

a lens support comprising a carousel 100 designed and arranged to receive a pair of lenses L1, L2 and blocking accessories 450 and to move them amongst a plurality of positions;

an image acquisition device 200 serving to measure automatically various optical and geometrical characteristics of the lenses L1, L2 in order to determine a frame of reference for centering each lens;

feeler means 300 designed and arranged to feel each ophthalmic lens L1, L2 in preparation;

blocking means 400 comprising the blocking accessories 450 and a manipulator arm 401 designed and arranged to place one of the blocking accessory 450 on each of the ophthalmic lenses L1, L2;

a hood 500 enclosing all of the above-mentioned members to protect them, and possessing a restricted access door 501;

a touch display screen 600 of the liquid crystal display (LCD) or thin film transistor (TFT) or indeed light-emitting diode (LED) type; and electronic and computer processor means 700 for controlling the various above-mentioned members.

Ophthalmic Lenses

The ophthalmic lenses L1, L2 in preparation are lenses as supplied by a lens manufacturer and ready for edging. By way of example, they may be single vision lenses, multifocal lenses with one or more segments for near vision or intermediate vision, with power discontinuity, or indeed multifocal lenses with progressive addition of power. The lens described below is a single vision lens.

Figure 3:
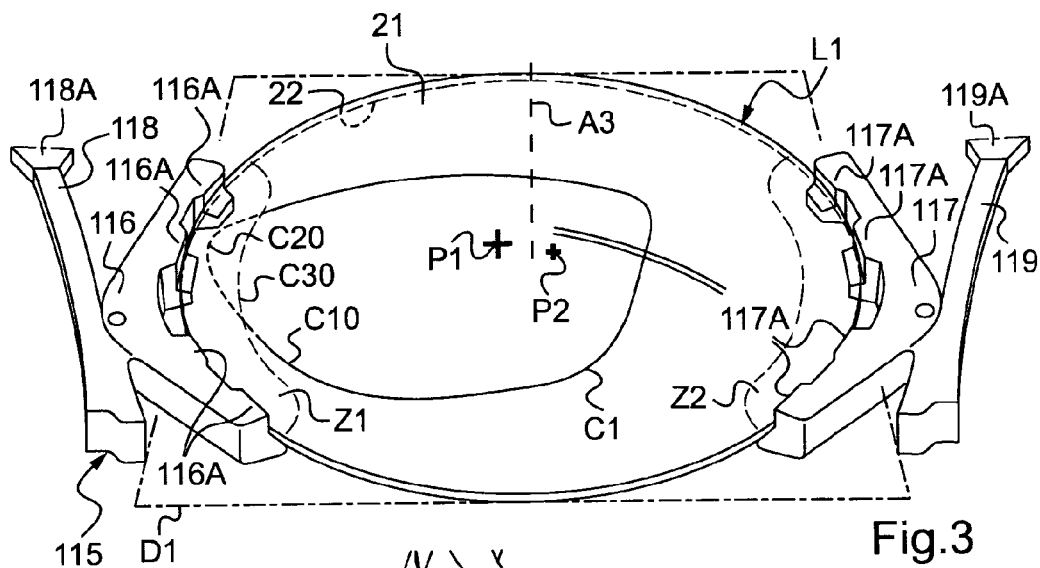
FIG. 3 is a perspective view of clamping jaws for holding an ophthalmic lens, enabling the ophthalmic lens to be loaded onto and held on the FIG. 2 support.

As shown in FIG. 3, the ophthalmic lens L1 presents, in like manner to the ophthalmic lens L2 that is not shown in this figure, two optical faces, comprising a convex front face 21 and a concave rear face 22, together with a peripheral edge face that is of circular shape.

The general plane D1 of the ophthalmic lens L1 is defined as the plane in which the rear edge of the peripheral edge face of the lens extends. The axis A3 of the ophthalmic lens L1 is also defined as being the axis that is orthogonal to the general plane D1 and that passes through the center of the circle formed by the edge face of the lens.

The shapes of the convex face 21 and of the concave rear face 22 determine the optical correcting power of the ophthalmic lens L1. The optical correcting power of a corrective ophthalmic lens is defined by its spherical, cylindrical, and prismatic refringence properties.

Amongst these refringence properties, the first to be defined is the spherical optical power which is the magnitude that characterizes the "magnifying glass" effect of the lens. This power corresponds to the reciprocal of its focal length. The point of the lens where the magnifying glass effect is zero is referred to as the optical centering point P2 (i.e., for a lens having optical power that is exclusively spherical, the point where an incident ray striking the lens perpendicularly gives rise to a transmitted ray on the same axis).

Cylindrical optical power is defined as the magnitude for correcting astigmatism and that characterizes, so to speak, the effect of the image being deformed about an axis passing through the optical centering point P2, and commonly referred to as the cylinder axis.

Finally, the prismatic optical power is defined as the magnitude that corrects the deflection effect on the image. This deflection is achieved by inclining the convex front face 21 of the lens relative to its concave rear face 22 at the optical centering point P2.

The ophthalmic lens L1 may also be polarized in a uniform polarization direction.

The ophthalmic lens L1 is also designed to be shaped to have a predetermined outline C1 in the general plane D1 of the lens. The predetermined shape is generally previously acquired by the optician as a function of the shape of an eyeglass frame selected by a client. More precisely, if the frame is of the rimmed type, acquiring the shape of the bezel of each of the two rims of the frame provides the shape of the predetermined outline C1. In contrast, if the frame is of the pierced or half-rimmed type, acquiring the shape of a presentation lens or of a template associated with the selected frame provides the shape of the predetermined outline C1.

Blocking Accessories

The blocking accessories 450 are members suitable for being applied to an optical face of the ophthalmic lens L1, specifically its convex front face 21, in order to mark and conserve its centering frame of reference. These blocking accessories 450 are sometimes also referred to as centering-and-drive pads or holder blocks.

As shown in FIG. 6, each blocking accessory 450 presents a base 451 adapted to be gripped by the manipulator arm 401, and a support 453 designed so that one of its faces, referred to the contact face 452 (FIG. 5), can be pressed against the convex front face 21 of the ophthalmic lens L1 and can fit closely to the shape thereof. In this example, the contact face 452 is coated in an adhesive suitable for sticking to the ophthalmic lens L1. The base 451 is in the form of a truncated cone having an angle at the apex lying in the range 5 degrees to 20 degrees, 10 degrees in this example, while the support 453 that is situated beside the base of said cone generally presents the shape of a thick disk.

The base 451 of each blocking accessory 450 also presents a bore 454 of axis that is strictly parallel to (i.e. does not coincide with) the axis of the cone formed by the base. This keying bore 454 serves to determine the orientation of the blocking accessory 450 the axis of the cone.

Figure 5:
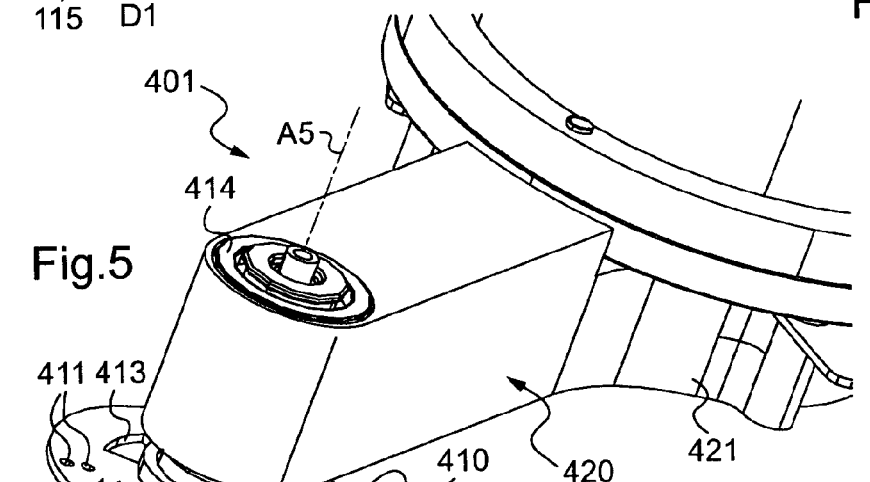
FIG. 5 is a perspective view of the FIG. 4 manipulator arm.

Amongst the blocking accessories 450, there may optionally be provided accessories of larger diameter and accessories of smaller diameter. In any event, as shown in FIG. 5, the support 453 of each blocking accessory 450 includes, projecting from its peripheral side face, two tongues 460 that are diametrically opposite about the axis of the cone and that are provided with openings 461. These tongues 460 and these openings 461 form marker elements of the blocking accessories 450 in the sense that when the accessory is placed in the treatment position by the image acquisition device 200, not only do the images of the tongues 460 with their openings 461 appear in the overall image as acquired by the acquisition device, but their images are also easily identifiable in the overall image because of the characteristic shapes presented by these tongues 460 and these openings 461.

The Carousel

As shown more particularly in FIGS. 4, 6, and 7, the carousel 100 comprises:

- a turntable 102 for loading and unloading lenses, which turntable is mounted on the common base structure 10 of the preparation device 1 to turn abut an axis of rotation A1 that passes substantially through its center and that is perpendicular to the plane of the turntable;
- two seats 11 for loading and unloading lenses L1 and L2; and
- holder means 115, 125 for holding the lenses L1, L2 placed on the turntable 102.

As shown in FIGS. 1 and 2, access to the turntable 102 of the carousel 100 is restricted by an access door 501. This access door 501 is constituted by two sectors 502, 503 that can pivot in opposite directions to cause a loading zone 12 to appear so as to enable the lenses L1, L2 to be loaded and unloaded.

As shown in FIGS. 6 and 7, the turntable 102 has five recesses 110, 120, 130, 131, and 150 that are regularly distributed around its axis of rotation A1. Two adjacent recesses form reception locations 110, 120 suitable for receiving the two ophthalmic lenses L1, L2. The recesses disposed on opposite sides of these reception locations 110, 120 form calibration openings 130, 131. Finally, the last recess, situated between the two calibration openings 130, 131, forms an updating opening 150.

Each of the reception locations 110, 120 presents a shape that is substantially circular and of diameter that is slightly greater than the standard diameter of lenses for shaping (about 70 millimeters).

Each reception location 110, 120 is associated with a clamping jaw 115, 125, the two clamping jaws forming the lens holder means (FIGS. 3 and 7). These jaws are provided with hinge-mounted fingers 116, 117 that, when seen from above, are generally V-shaped and they are pivotally mounted on rods 118, 119 (FIG. 3) at half-height thereon. One end of each rod is mounted to pivot about an axis parallel to the axis of rotation A1 of the turntable 102. In this way, the hinge-mounted fingers 116, 117 can move towards each other into a closed position or apart from each other into an open position. The other end of each rod 118, 119 is free and is provided with a shoe 118A, 119A. Whatever their open or closed position may be, the hinge-mounted fingers of each of the clamping jaws 115, 125 are arranged symmetrically about the center of the corresponding reception location 110, 120. The clamping jaws 115, 125 are urged towards the closed position by a resilient element such as a return spring (not shown). Furthermore, the jaws are driven towards the open position by a particular drive mechanism that is controlled by an electric motor (not shown).

Each reception location 110, 120 of the turntable 102 is also provided with a clip, that like a jaw, is adapted to close on the shoes 118A, 119A of the rods 118, 119 of the clamping jaws 115, 125 when the clamping jaws are in the closed position. In this way, when a lens is gripped by the hinge-mounted fingers 116, 117 of a clamping jaw, the two ends of each rod are held in manipulator, thereby imparting good rigidity to the clamping jaw.

In particular, when one of the optical faces 21, 22 of the ophthalmic lens L2 is subjected to a force applied by the feeler means 300 or the blocking means 400 along its axis A3 or transversely relative to said axis, the rods do not bend and they do not move, thereby imparting increased accuracy to the preparation device.

As shown more particularly in FIG. 3, the hinge-mounted fingers 116, 117 of each jaw 115 present, beside their inside faces, four projections 116A, 117A that are adapted to grip the ophthalmic lens L1 placed in the corresponding reception location. The inside faces of these projections all present a plane top portion lying in a plane parallel to the axis A3 of the lens to be held (corresponding substantially to the axis of the reception location), and a plane bottom portion that is inclined and faces towards the top of the turntable 102. The top portions of the inside faces of the projections 116A, 117A enable the ophthalmic lens L1 to be prevented from moving laterally, while the bottom portions enable the lens to be supported when an axial force is generated thereon, substantially along an axis parallel to its axis A3. In this way, if a force is applied to the lens, the lens retains its position regardless of the direction of the force.

The clamping jaws 115, 125 are mounted on the turntable 102 in such a manner that when it turns, the clamping jaws 115, 125 turn together with the turntable 102.

Figure 8:
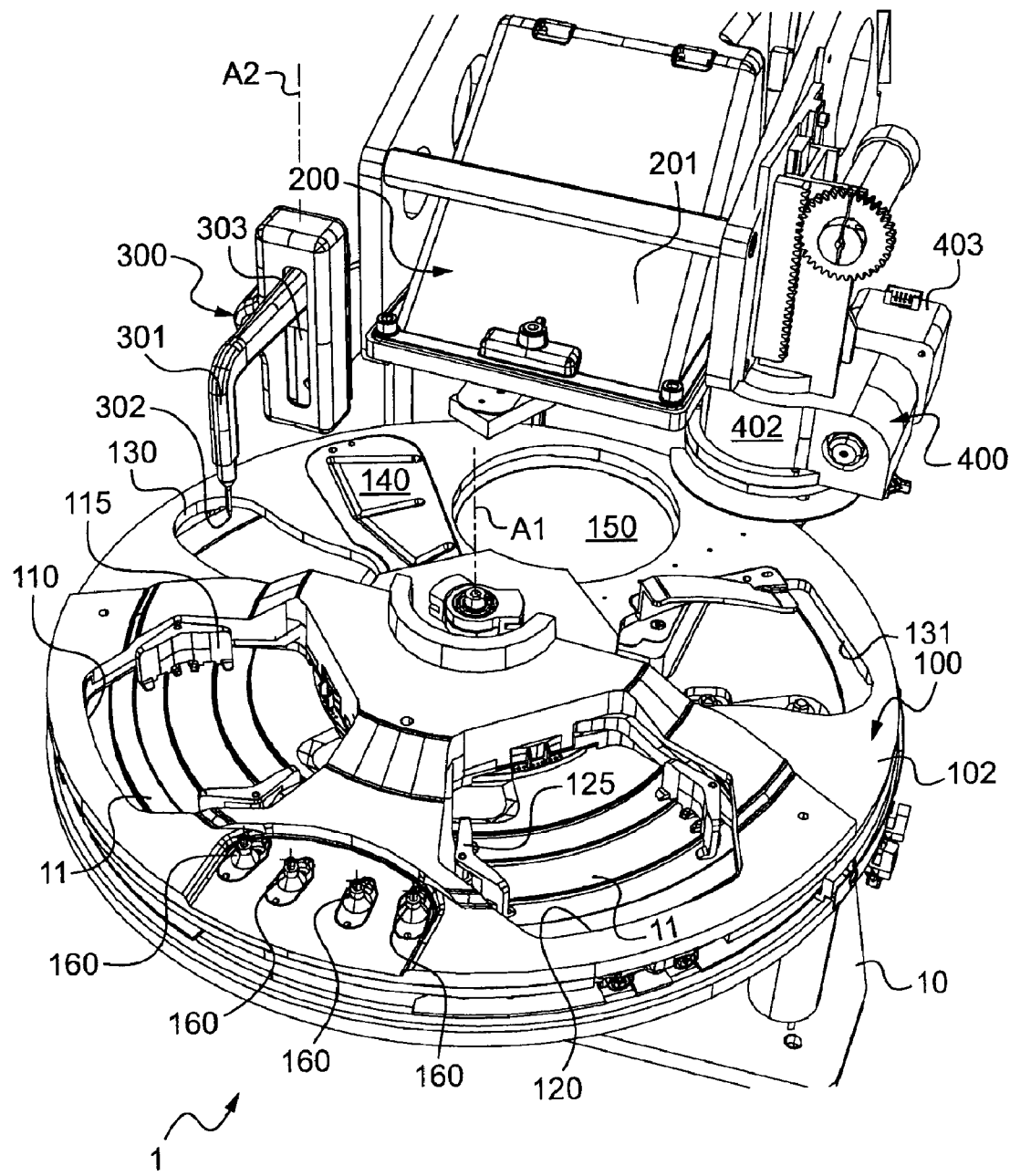
FIG. 8 is a perspective view of the inside of the FIG. 1 preparation device shown in a "rest" configuration of the support in which the lenses and the blocking accessories are disposed facing the access door.

The seats 11 situated in the loading zone 12 are located a little below the turntable 102, and each of them presents a shape that is substantially circular and of diameter slightly greater than the diameter of the reception locations 110, 120 (FIG. 8). The seats 11 are mounted stationary relative to the base structure 10 such that when the turntable 102 is brought into the lens loading and unloading position, the reception locations 110, 120 are placed facing the seats 11. In this loading and unloading configuration, the ophthalmic lenses L1 and L2 are carried by the seats 11 (the clamping jaws being controlled to occupy the open position). In other configurations of the turntable 102, the lenses are held laterally and axially by the clamping jaws 115, 125 (the clamping jaws are controlled to occupy the closed position).

The seats present top faces of pale color, e.g. white, and they are covered in a polarized coating that can be seen by the optician when the turntable 102 is in the lens loading and unloading position. This coating enables the optician to place the lenses on the turntable 102 in such a manner that the polarization directions of the lenses are directed substantially tangentially relative to the turntable. In a variant, the seats could be coated in a light-emitting sheet suitable for diffusing polarized light.

As shown in FIG. 7, each reception location 110, 120 includes, projecting into the recess it forms, a blade 112, 122 that is pierced by a plurality of openings 111, 121 (in this example nine openings) of axes parallel to the axis A1 of the turntable 102. These openings 111, 121 form a corresponding number of elements for identifying the position of the turntable 102 on the base structure 10, insofar as they can be identified by the processor means 700 in an image acquired by the acquisition device 200. These blades 112, 122 are fastened on the turntable 102 in such a manner that the processor means 700 can deduce the angular position of the turntable 102 about its axis rotation A1 from the positions of the openings 111, 121.

The calibration openings 130, 131 present shapes that are substantially oblong, extending along axes that are perpendicular to the axis of rotation A1 of the turntable 102. As described in greater detail below, these calibration openings 130, 131 are designed to make it easier to identify the position of the manipulator arm 401 relative to the base structure 10, prior to placing a blocking accessory 450 on each lens L1, L2.

The updating opening 150 is circular in shape and of diameter that is substantially equal to the diameter of the reception locations 110, 120. The updating opening 150 is situated on the turntable 102 opposite from the reception locations 110, 120 such that said updating opening 150 faces the image acquisition device 200 when the reception locations are situated in the loading zone 12.

The turntable 102 also includes, between its two reception locations 110, 120, four rods 160 projecting from the top face of the turntable 102 along axes that are parallel to the axis A1 of the turntable. These rods 160 are designed to receive the blocking accessories 450. More precisely, the centers of the contact faces of the blocking accessories 450 are pierced by bores suitable for being engaged on the rods 160 so that the blocking accessories 450 are properly held on a turntable 102.

As shown in FIG. 7, each rod 160 is fastened to a support 108 that is inserted in an opening 109 of the turntable 102 and that is fastened therein.

The turntable 102 also permanently carries calibration paths 140 suitable for calibrating the feeler means 300. These calibration paths 140 are disposed on either side of the updating opening 150.

More precisely, on one side of the updating opening 150, the calibration paths comprise five rectilinear grooves 141 that are not parallel and that are situated in the plane of the turntable 102. These grooves are disposed in such a manner that one of the two ends of each groove coincides with the end of one of the other grooves. Each of the ends of these rectilinear grooves 141 is pierced by a respective through bore 143 forming an element for identifying the positions of the grooves.

On the other side of the updating opening 150, the calibration paths comprise a ramp 142 formed by a flat that slopes relative to the axis A1 of the turntable 102, and by two horizontal flats that are situated at the ends of the sloping flat and that extend in planes orthogonal to the axis of rotation A1 of the turntable.

Five through holes 101 forming elements for identifying the position of the turntable 102 are disposed beside the ramp 142, on a straight line perpendicular to the axis of rotation A1. These five holes can be identified by the processor means 700 in an image acquired by the acquisition device 200. They thus constitute elements for identifying the position of the turntable 102 relative to the base structure 10. Their positions make it possible in particular for the processor means 700 to determine the position of the axis of rotation A1 of the turntable 102 relative to the base structure 10.

Image Acquisition Device

The image acquisition device 200 (FIG. 4) possesses two main functions. Its first function consists in measuring the local optical powers of the lens at remarkable points thereof, such as the optical centering point P2.

Its second function consists in detecting and locating centering or marker characteristics of the lens in order to establish or position the lens appropriately in an overall frame of reference known to the device. When an ophthalmic lens is mounted in a frame, it is important, for the visual comfort of the wearer, to ensure that the lens is properly positioned relative to the eye for which it is to correct a defect of refraction or of accommodation.

Overall, an ophthalmic lens is centered when, the optical centering point (for single vision lenses or multifocal lenses with power discontinuity) or the reference center (for progressive lenses) of the ophthalmic lens as specified during its design is superposed on the center of the pupil of the eye, or in other words, when the line of gaze passes through the optical centering point P2 or the reference center of the ophthalmic lens. Centering is thus the result of comparing two geometrico-optical data sets: the morphology of the wearer's pupil, and the position of the lens of the optical centering point or of the reference center. In order to be able to perform the desired optical function, the lens must also be properly oriented about its optical axis.

The image acquisition device 200 may be of any type. The overall optical measurement may be obtained by deflection measurement (of the Hartmann, moire, etc.) type, by interferometry, by wave propagation, etc. The user interface may then display not only the optical centering point or reference point, but also maps of the powers and/or the orientation of the axis of the lens in order to obtain an overall measurement of one or more of its optical characteristics, at a plurality of points over the major fraction of is extent.

In general, the image acquisition device 200 comprises, on either side of the turntable 102, polarized lighting means 201 and imaging means (not shown) controlled by the processor means 700. In this example, the lighting means 201 comprise a source of light associated with a collimator lens. The imaging means comprise image capture means (such as a camera) and, between the image capture means and the turntable 102, a Hartmann plate that is adapted to display a matrix of aligned points, and a translucent screen on which there appears an image of the matrix of points, referred to as the source image. Thus, when an ophthalmic lens L1, L2 is placed in position for treatment by the image acquisition device 200, i.e. between the lighting means 201 and the imaging means, the image capture means see the source as deformed by the lens. Once the captured image has been compared with the (non-deformed) source image, it is possible to determine the local optical powers of the lens and to detect and locate the centering or marker characteristics of the lens.

Figure 10:
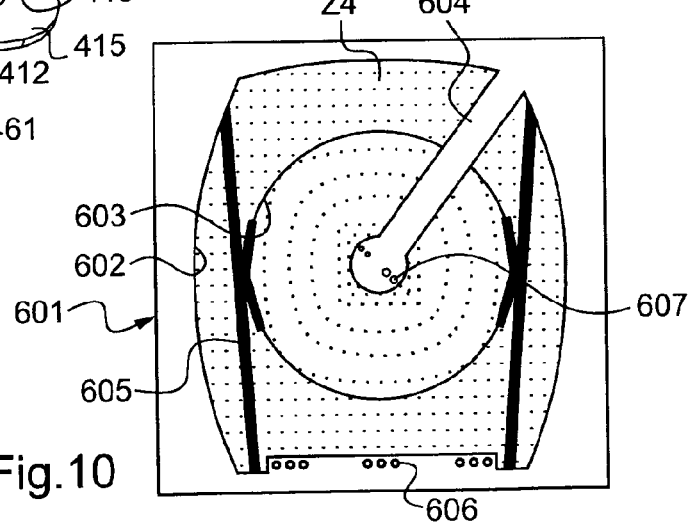
FIG. 10 is a view of a picture of one of the ophthalmic lenses acquired by the FIG. 4 image acquisition device.

As shown in FIG. 10, the captured image 601 presents:
- the image 602 of the reception location 110, 120 of the ophthalmic lens being observed, and the image 606 of its marker elements 111, 121;
- the image 603 of the ophthalmic lens;
- the image 604 of the manipulator arm 401 (and the image 607 of its marker elements that are described below); and
- the image 605 of the jaw 115, 125 clamping the ophthalmic lens.

An example of the image acquisition device 200 is described in detail in the Applicant's French patent application No. FR 2 878 972 filed on Dec. 3, 2004.

Feeler Means

As shown in FIG. 4, the feeler means 300 comprise a first feeler arm 301 disposed above the turntable 102. They also comprise a second feeler arm that is disposed under the turntable 102 facing the first feeler arm 301 and not shown in the figures. These two feeler arms are arranged to act together (or in a variant independently) to feel both of the optical faces 21, 22 of the ophthalmic lenses L1, L2.

For this purpose, each feeler arm 301 comprises an angled branch having a first portion that extends in a plane parallel to the plane of the turntable 102 with its end connected to actuator means 303, and a second portion that extends along an axis parallel to the axis of rotation A1 of the turntable 102 with its free end forming a feeler end 302. The two feeler ends 302 of the two feeler arms 301 point towards each other so as to be capable of being brought into contact with the front and rear optical faces of the ophthalmic lenses L1, L2. On each of the two feeler ends 302 there are mounted conventional mechanical feelers that operate merely by mechanical contact.

One and/or the other of the two feeler arms 301, and in this example both of them, are mounted to be movable in translation along axes parallel to the axis of rotation A1 of the turntable 102. These movements in translation enable the two feeler ends 302 to be moved apart or towards each other. The movements in translation of the feeler arms 301 are controlled independently from each other by electrical motor-coders (not shown).

One and/or the other of the two feeler arms 301, and in this example both of them, are mounted to be movable in rotation about a common pivot axis A2 that is substantially parallel to the axis of rotation A1 of the turntable 102. Turning movements of the two feeler arms 301 take place together under the control of a single electric motor (not shown). These turning movements, in combination with the turning movements of the turntable 102, enable the feeler ends 302 to be positioned facing a plurality of points on the turntable 102. More precisely, when the turntable 102 is in position for treatment by the feeler means 300, i.e. when one of the reception locations 110, 120 is situated between the two feeler arms 301, the simultaneous and combined turning movements of the feeler arms 301 and of the turntable 102 enable the surfaces of the optical faces of the ophthalmic lens held in said reception location to be felt in their entirety.

Blocking Means

A blocking point P1 is defined on each ophthalmic lens L1, L2 where one of the blocking accessories 450 is to be placed. This blocking point P1 is selected to coincide with a point known as the boxing center, well known to the person skilled in the art. It is recalled that the boxing center is the point of intersection of the diagonals of the horizontal rectangle in which the predetermined outline C1 of the lens is inscribed in the wearing configuration (defining horizontality). The boxing center is determined by the image acquisition device 200 as a function of marker characteristics measured on the lens, of morphology parameters of the wearer, and of geometrical parameters of the corrective frame. For one of the two optical faces of the lens, in this example the convex front face, a blocking axis is defined that is known as the "boxing axis" being the axis that is substantially normal to the surface of the face in question of said lens and passing via the boxing center.

The blocking means 400 are designed and arranged to enable one of the blocking accessories 450 to be gripped, moved, and docked against one of the two optical faces of said lens (in this example the convex front face). The blocking accessory 450 is applied to the convex front face while being moved in translation along the blocking axis of the lens, and while being held rigidly during this movement in translation.

As shown more particularly in FIGS. 4 and 5, the blocking means 400 comprise not only the manipulator arm 401, but also a top body 402 of substantially cylindrical shape on an axis A4 that is substantially parallel to the axis of rotation A1 of the turntable 102.

This top body 402 is movable in translation along a guide rail 404 that is fastened to the base structure 10 in a direction parallel to the axis A4. Movement in translation along the axis A4 is driven by means of a mechanical system including a pinion 405 that meshes with a rack 406. For this purpose the rack 406 is fastened to the base structure 10 parallel to the guide rail 404. The pinion 405 is secured to an outlet shaft from an electric motor 407 that is fastened to the top body 402 and controlled by the processor means 700.

The manipulator arm 401 presents a cylindrical portion 421 centered on the axis A4 and placed beneath the top body 402, an elongate body 420 attached to the side face of the cylindrical portion 421, and a reception head 410.

The elongate body 420 is in the form of a rectangular parallelepiped and extends transversely relative to the axis A4 of the top body 402, i.e. parallel to the plane of the turntable 102.

The cylindrical portion 421 of the manipulator arm 401 is mounted to turn on the top body 402 about the axis A4, thereby enabling the manipulator arm 401 to pivot about the axis A4. This pivoting is controlled by means of a set of gears (not shown) and a stepper electric motor 403 controlled by the processor means 700. Combined with the rotation of the turntable 102, it enables the reception head 410 to be positioned in the desired position relative to the turntable 102.

In a variant, the manipulator arm could be mounted on the base structure with two freedoms of movement in translation along axes parallel to the plane of the turntable. That would enable the reception head to be positioned in the desired position relative to the turntable without it being necessary for the turntable to change position.

In this example, the reception head 410 includes a cylindrical sleeve 414 that is engaged in a bore made at the free end of the elongate body 420. The sleeve extends vertically along an axis A5 that is substantially parallel to the axis A4 towards the bottom of the device, i.e. towards the turntable 102. The angular position of the cylindrical sleeve 414 about the axis A5 is controlled by a device located inside the elongate body 420 and including a belt and a stepper electric motor controlled by the processor means 700.

Beside the bottom end of the cylindrical sleeve 414, the reception head 410 also includes a circular collar 415 of diameter that is approximately equal to twice the diameter of the cylindrical sleeve 414, together with a gripper element 416 that constitutes means for taking hold of and positioning one of the blocking accessories 450 on the lens.

In particular, the collar 415 includes two diametrically-opposite windows 413 that are visible in the image captured by the acquisition device when the manipulator arm 401 is in position for treatment by the image acquisition device 200 (i.e. when the reception head 410 of the arm is situated between the lighting means 201 and the imaging means of the image acquisition device 200). More precisely, these windows 413 are spaced apart from each other by a distance that is substantially equal to the distance between the tongues 460 of each blocking accessory 450. Thus, when a blocking accessory is gripped by the manipulator arm 401 and presents a suitable position relative to the manipulator arm 401, the tongues 460 are visible through the windows 413. The processor means 700 can thus use the captured image to ensure not only that a blocking accessory is present on the arm, but also that the blocking accessory is properly positioned on the arm.

The collar 415 also has two pairs of small circular openings 411, 412 that form elements for identifying the position of the manipulator arm 401 and of its reception head 410 when no blocking accessory 450 is gripped by the arm. The openings 411, 412 of each pair are disposed beside each other, on a common radius of the collar 415. The two radii of the two pairs of openings are mutually orthogonal. The openings 412 of one of the pairs of openings are also smaller than the openings 411 of the other pair, such that their images in the captured images present shapes that can be distinguished by the processor means 700.

The gripper element 416 possesses a housing (not shown) for receiving the base 451 of one of the blocking accessories 450. This housing is conical in shape, flaring towards its mouth. The angle at the apex of this cone is equal to the angle at the apex of the conical base of each blocking accessory 450, such that once the base is gripped by the manipulator arm 401, the base fits perfectly against the shape of the housing. In order to hold the blocking accessory temporarily in the housing, the housing is provided with a base-clamping spring, or in a variant with a permanent magnet suitable for co-operating with a metal insert in the base of the blocking accessory 450.

The gripper element 416 of the reception head 410 is also connected to the elongate body 420 of the manipulator arm 401 (or to the cylindrical sleeve 414) by a ball joint presenting two freedoms of movement in rotation about two mutually perpendicular axes that are perpendicular to the axis A5. This ball joint is designed so that the pivot point P3 of the gripper element 416 about these two axes is situated at the center of the contact face 452 of the accessory when a blocking accessory 450 is gripped. Thus, regardless of the orientation of the gripper element 416 about these two axes, the center of the contact face presents a position that does not vary. Consequently, the position of the blocking accessory 450 on the lens is not a function of the orientation of the blocking accessory about these two axes.

The blocking device also possesses rest means (not shown) for putting the manipulator arm 401 to rest. These rest means may be of the same type as those used for putting the arm of a record player to rest, with a seat for retaining the arm in a high position, against which seat the arm comes to bear after pivoting while in its high position to a rest angular position. A holder catch is also provided for preventing movement of the arm in the rest position when bearing against the high abutment.

Processor Means

In this example, the processor means 700 comprise an electronics card designed to control the various members of the preparation device 1 in a coordinated manner, such as the turntable 102, the image acquisition device 200, the feeler means 300, and the blocking means 400, in order to implement the automated processing method that is described below.

By way of example, and in conventional manner, the processor means 700 comprise a mother board, a microprocessor, random access memory, and permanent mass memory. The mass memory contains a program for executing the automated mounting-preparation method of the invention that is described below. The mass memory is preferably rewritable and it is advantageously removable so as to enable it to be replaced quickly or programmed on a remote computer via a standard interface. In particular, the mass memory is designed to store the predetermined outline C1, the data measured by the feeler means, a file that is representative of the shape of the calibration means, and the shapes and positions of the marker elements respectively of the turntable 102 and of the manipulator arm 401 relative to the axis of rotation A1 of the turntable and to the axis of rotation A4 of the manipulator arm.

The preparation device 1 includes a plurality of computer connectors 701 to enable the processor means 700 to send and receive data. In particular, it includes a connector for connecting to a device for machining the ophthalmic lenses L1, L2.

Method

The mounting preparation device described above can be used for implementing a preparation method that is described below.

In this example, lens processing is performed on a job basis. The term "job" as commonly used in the eyeglass profession designates a pair of ophthalmic lenses L1, L2 that are to be assembled to a single frame for wearing by a wearer.

Job processing comprises five main operations referred to as loading, centering, feeling, blocking, and unloading, each of which operations is itself subdividable into a plurality of steps.

Preliminary Step: Inputting or Receiving Job Order Data

In order to mount lenses correctly, in a preliminary step the optician fits the selected frame on the wearer and takes various morphological measurements on the wearer using an appliance referred to as a "pupillometer" or any other measuring or imaging appliance. In particular, the optician thus determines the pupillary distance that represents the distance between the two pupils, or the two pupillary half-distances that represent the distances between each of the pupils and the center of the wearer's nose. The optician also determines pupil height, which represents the distance vertically relative to each pupil between the pupil and the bottom edge of the corresponding rim of the frame worn by the wearer. This pupil height may be measured using a rule, or by means of a digital system adapted to acquire an image of the wearer's face while wearing the frame, and then in processing the image.

Furthermore, the optician or operator records in the mass memory of the processor means 700 optical order data constituted by prescription parameters relating to the wearer for whom the job being prepared is intended. This data comprises in particular the spherical, cylindrical, and prismatic optical powers and also the cylinder and prism axes, and the polarized or non-polarized nature of the lenses being prepared.

Finally, geometrical order data constituted by information representing the shape of the predetermined outline C1 (corresponding to the shape of the selected frame) is also recorded in the mass memory of the processor means 700. The shape of the predetermined outline C1 of each lens is then obtained by means of an outline reader appliance (not shown) that is specially designed to read the internal outline of the rims of the frame or the outline of a lens template, or indeed the outline of a presentation lens that is provided with the selected frame. The reader appliance possesses means for communicating with the processor means 700 so as to deliver thereto the geometrical data concerning the predetermined outline C1 of each lens. By way of example, such an outline reader appliance is described and shown in document FR 2 890 189 in the name of the applicant.

In a variant, provision could also be made for the desired shape to be obtained from a prerecorded electronic file or a file that is supplied by the manufacturer.

Loading Operation

Step 1: Waiting for a Job

With reference to FIG. 8, when the preparation device 1 is not in use, the processor means 700 control the turntable 102 to pivot about its axis of rotation A1 so as to place the updating opening 150 in position for processing by the image acquisition device 200. In this way, the reception locations 110, 120 of the turntable are positioned in the loading zone 12, which remains closed by the access door 501. As recalled above, in this loading configuration, the reception locations 110, 120 are situated beneath the seats 11. The clamping jaws 115, 125 associated with these reception locations are in the closed position.

During this step, the image capture means are controlled by the processor means 700 to take pictures at regular intervals, e.g. once every minute, of the source image displayed by the imaging means.

Step 2: Opening the Access Door

Initially, the access door 501 is closed. The general rule is that the access door remains closed so as to protect the internal members of the preparation device 1, and in particular its turntable 102. At the request of the optician (e.g. by touching the touch screen 600), opening of the access door 501 is authorized by the processor means 700. The two sectors 502, 503 of the access door 501 then move apart from each other by pivoting to reveal the loading zone 12. This opening is automatically accompanied by the clamping jaws 115, 125 opening.

If during a predetermined duration (which may be set by the optician), the preparation device remains unused, then the processor means 700 automatically cause the access door 501 and the clamping jaws 115, 125 to be closed.

Step 3: Loading the Lenses and the Blocking Accessories

In practice, the two ophthalmic lenses L1, L2 of the job are placed manually by the optician on the two seats 11 that are accessible through the access door 501 and the reception locations 110, 120 of the turntable 102. Naturally, it is also possible to envisage the lenses being loaded automatically.

If the ophthalmic lenses L1, L2 of the job are not polarized, then the orientations of the lenses about their axes A3 (FIG. 3) are immaterial. In contrast, if the lenses are polarized, then the optician observes how the orientation of the lenses causes the brightness of the images of the seats 11 as seen through the lenses L1, L2 to vary. The optician then positions each lens L1, L2 in such a manner that the brightness of the image is at a maximum. This ensures that the polarization directions of the lenses and of the polarized coatings of the seats 11 are parallel. The polarization directions of the imaging means and of the ophthalmic lenses L1, L2 are thus substantially parallel when the lenses are taken by the turntable 102 to the position for being processed by the image acquisition device 200. The pictures of the lenses will therefore be bright, such that the processor means 700 can analyze the pictures easily.

Two or four blocking accessories 450 are then placed by the optician on the rods 160 (FIG. 4) of the turntable 102.

When the optician has positioned both lenses and the accessories in the carousel 100, the access door 501 is closed. The clamping jaws 115, 125 are then automatically caused to take up a closed position so that their hinge-mounted fingers clamp onto the ophthalmic lenses L1, L2.

Centering Operation

Step 1: Acquiring an Image of a First Lens of the Job

The processor means 700 then control the turntable 102 so as to pivot and bring the reception location 110 of the first lens L1 into position for processing by the image acquisition device 200. The image capture means then take a new picture of the source image as deformed by the lens.

The processor means 700 then compare this new picture with the most recent previous picture of the non-deformed source image as taken during step 1 of the loading operation. This comparison makes it possible to calculate the optical power data, the orientation of the cylinder and prism axes, and data relating to the frame of reference of the lens (optical centering point P2 and orientation of the lens). This data is then stored in the mass memory.

It will be understood that the position of the image at each point in the matrix of points constituting the source image needs to be acquired accurately in each picture so that the calculation gives a correct result. Nevertheless, it can happen that the source image as displayed by the imaging means moves over time, such that the points in its matrix of points change position. In this example, the time that elapses between the moment when the most recent previous picture was taken and when the new picture is taken is small, thereby limiting any change in the positions of the points.

In order to further refine calculation, the processor means 700 identify, in the new picture, those points of the matrix of points that are situated in a zone Z4 that lies outside the image 603 of the lens (FIG. 10), but within the image 602 of the reception location 110. In the new picture, the images of these points are not deflected by the lens; they are therefore assumed to present positions that are identical to the positions of the same points in the most recent previous picture. If the position of the matrix of points varies over time, it varies in such a manner that the entire matrix moves a small amount in pivoting or in translation. By comparing the positions of these points, the processor means 700 can determine whether the source image has moved between taking two pictures, and if it has, it can adjust the position of the set of points in the most recent previous picture prior to comparing the two pictures.

The accuracy with which optical powers are calculated also depends on the distance between the image capture means and the concave rear face 22 of the ophthalmic lens L1. This distance generally presents a mean value that is stored in the mass memory. The mean value is corrected in this example for each lens as a function of the height of the center of the concave rear face 22 of the ophthalmic lens L1. For this purpose, this height is acquired during the operation of feeling the lens.

Furthermore, the above-described acquisition of the marker characteristics makes it possible for the processor means 700 to determine the position that needs to be presented by the predetermined outline C1 of the ophthalmic lens L1 so that the lens is correctly centered. The processor means 700 then deduce therefrom the exact position for the blocking point P1 of the lens L1 (boxing center).

Finally, the processor means 700 use the positions in the new picture of the images of the openings 111 in said reception location 110 to identify the exact position of the turntable 102 and its reception location 110 during the centering operation. This position is then stored in the mass memory.

Step 2: Acquisition of an Image of a Second Lens in the Job

Figure 9:
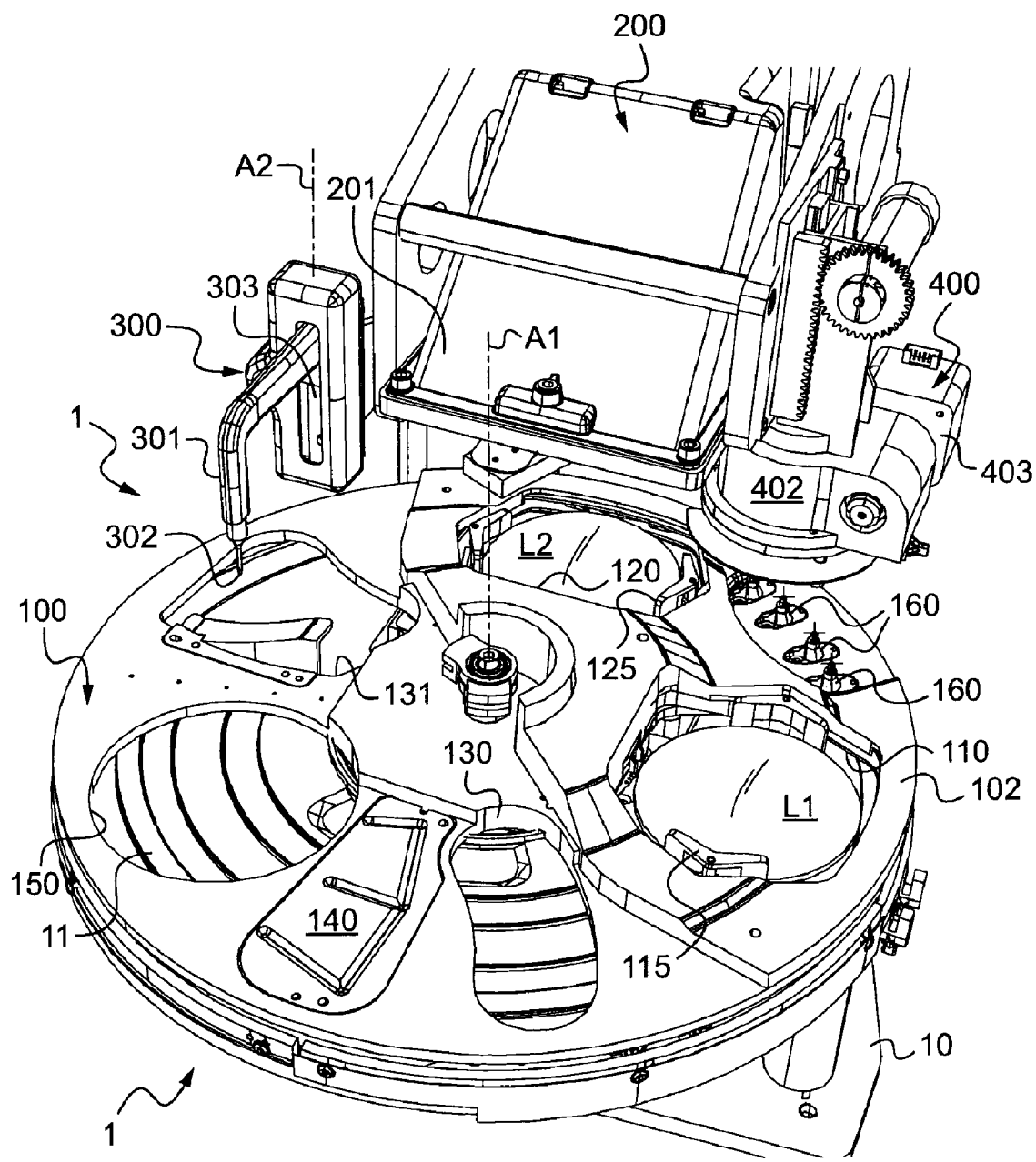
FIG. 9 is a perspective view of the inside of the FIG. 1 preparation device in a configuration of the support where one of the lenses can be centered by the acquisition device of FIG. 4.

The processor means 700 then proceed in the same manner to calculate the optical power data and the data relating to the frame of reference of the second ophthalmic lens L2, by bringing the second reception location 120 into position for processing by the image acquisition device 200 (FIG. 9). With this lens, likewise, the exact position of the turntable 102 and of said reception locations 120 are acquired and stored in the mass memory.

Step 3: Comparing the Characteristics of the Job with the Control Data

The processor means 700 act automatically or with assistance to examine whether the characteristics of the two lenses L1, L2 of the job are valid. This validation examination consists in performing two verifications:

verification that the characteristics measured on each lens of the job comply with the order data input by the optician; and checking that, taken together, the characteristics of the two lenses considered as a single job are consistent, i.e. as a function of them belonging to a single pair of eyeglasses, and in particular by simulating mounting the two lenses on the frame that has been selected and verifying that such mounting is possible.

The characteristics for which each lens is validated individually comprise the following in particular:

lens type: single vision, progressive, two or three focuses, etc.;

the spherical, prismatic, and cylindrical powers;

power addition for progressive lenses;

the cylinder and prism axes; and the tinted or non-tinted nature of the lens.

On the basis of information representative of parameters specific to the morphology of the wearer, and in particular the pupillary half-distances and the pupil heights, and of information representative of the outline of the selected frame, as acquired during the above-described preliminary step, the processor means 700 generate a video image that is displayed on the screen 600. Consequently, the screen shows at the same scale the outline of the frame and the outlines of the non-edged lenses, together with their particular characteristics, and in particular their boxing centers. The optician can then validate or not validate the centering of the lenses.

The blocking accessories 450 engaged on the rods 160 of the turntable 102 both present two standard diameters. It is then also verified, for each lens L1, L2, that a blocking accessory 450 is present with a diameter that is compatible with the predetermined outline C1, with the desired finish, and with the more or less slippery coating of the lens L1, L2. The processor means 700 verify in particular that the blocking accessory 450 has been positioned at the boxing center in such a manner that a minimum distance is left between the predetermined outline C1 and the outer wall of the blocking accessory 450. It is important to ensure that the blocking accessory does not come too close to the predetermined outline C1 so as to ensure that while the corresponding lens is being shaped, the accessory itself is not also subjected to machining.

In the event of incompatibility, the processor means 700 shift the blocking point P1 relative to the boxing center until a satisfactory position is found (complying with the above-specified criterion). If no satisfactory position is found, then an error message is displayed on the screen 600 asking for a special blocking accessory of small dimensions to be loaded.

Feeling Operation

Step 0: Calibrating the Feeler Means

This calibration is generally performed at regular intervals during Step 1 of the loading operation, i.e. while the preparation device 1 is not in use.

The processor means 700 then control the turntable 102 to pivot about its axis of rotation A1 so as to place the rectilinear grooves 141 in position for processing by the image acquisition device 200. In this position the image acquisition device 200 takes a picture of the calibration paths 140 so that the processor means 700 can identify, in the picture, the positions of the bores 143 passing through the rectilinear grooves 141. The processor means 700 then compare these positions with data from the file representative of the shape of the calibration paths 140 as stored in the mass memory. This comparison enables the processor means 700 to adjust the data stored in the file.

Thereafter, the processor means 700 control the turntable 102 to pivot so as to place the rectilinear grooves 141 in position for processing by the feeler means 300. They then control the motor-coder for actuating the feeler arm 301 to move in translation so that the feeler end 302 of the arm comes into contact with the turntable 102. The motor-coder then exerts a constant torque for causing the feeler arm 301 to apply a return force against the turntable 102 continuously. The processor means 700 then cause the turntable 102 and the feeler arm 301 to pivot simultaneously in combined manner and as a function of settings generated from the file so as to feel all five rectilinear grooves 141. This feeling serves in particular to acquire the positions of a plurality of points belonging to each of the rectilinear grooves 141, to compare the acquired positions with the positions of the through bores 143 (stored in the mass memory), and to deduce from said comparison the calibration parameters concerning the position of the feeler arm 301.

In this example, the calibration parameters are as follows:
  a first correction distance between a theoretical spacing stored in the file and a real spacing between the axes of rotation A1 and A2 of the turntable 102 and of the feeler arm 301;
  an offset angle between a setpoint angular position and a real angular position of the feeler arm 301 about its axis of rotation A2; and
  a second correction distance between a theoretical radius stored in the file and a real radius between the axis of rotation A2 of the feeler arm 301 and its feeler end 302.

Once these parameters have been determined, it is appropriate to calibrate movement in translation of the feeler arm 301 along its axis of rotation A2. To do this, after returning the feeler arm 301 to the high position, the processor means 700 control the turntable 102 to pivot about its axis of rotation A1 so as to place the ramp 142 in position for processing by the feeler means 300. Thereafter the motor-coder is controlled to move each feeler arm 301 in translation so that the feeler ends 302 of the arms come into contact with the ramp 142. The motor-coders then exert constant torques so as to cause the feeler arms 301 to apply return forces continuously against the ramp 142. Thereafter, the processor means 700 control pivoting of the turntable 102 in compliance with previously-determined setpoints so as to cause the feeler ends 302 of the arms to feel both faces of the horizontal and sloping flats of the ramp 142 along the same path. This feeling serves in particular to calibrate the motor-coders for moving the feeler arms 301 in translation in such a manner that the processor means 700 can subsequently accurately acquire the heights of the feeler ends 302 relative to the turntable 102 while feeling the optical faces of the lenses L1, L2.

Step 1: Feeling the Predetermined Outline of the First Lens

With the feeler arm 301 in the high position, the processor means 700 cause the turntable 102 to pivot about its axis of rotation A1 so as to place the first reception location 110 for the first lens L1 in register with the feeler means 300.

The feeler ends 302 of the feeler arms 301 then feel the optical faces of the ophthalmic lens L1 along the predetermined outline C1 of shape and position in the plane D1 of the lens that have previously been acquired. In this example, the front and rear 3D outlines are defined as curves lying respectively in the front and rear faces of the lens and having projections onto the plane D1 of the lens that coincide with the predetermined outline C1. The purpose of this step is thus to determine the three-dimensional coordinates of a plurality of points on these front and rear 3D outlines.

For this purpose, the processor means 700 control the motors for moving the feeler arms 301 in translation so that firstly the feeler ends 302 come into contact with the front and rear faces of the lens, and secondly the motors exert a constant torque to ensure that the feeler arms 301 apply a permanent return force against the ophthalmic lens L1. Thereafter, the processor means 700 control pivoting of the turntable 102 and of the feeler arms 301 in combination and in application of a setpoint function generated from the shape and the position of the predetermined outline C1 so that the feeler ends 302 feel said lens along the front and rear 3D outlines. The processor means thus acquire the coordinates of a plurality of points on the front and rear 3D outlines, which points are characteristic of the shapes of said outlines.

More precisely, feeling is performed in such a manner that the feeler arms 301 never come into contact with the clamping jaw 115 of the ophthalmic lens L1. For this purpose, prior to feeling the lens, the processor means detect zones of conflict Z1, Z2 (FIG. 3) in each of which there is a risk of the feeler arms 301 coming into conflict with the clamping jaw 115. These zones may be predetermined and stored in the mass memory, or they may be determined during the centering operation on the basis of the new picture in which there appears the image of the clamping jaw.

However it is done, the processor means 700 identify at this point the portion C10 of the predetermined outline C1 that lies outside the zones of conflict Z1, Z2 and the portion C20 that is situated within one of the two zones of conflict. The feeler arms are caused to move in the plane D1 in such a manner that they follow the predetermined outline C1 with the exception of its portion C20 situated in the zone of conflict Z1. In this portion, the feeler arms 301 are controlled to follow curves C30 forming parts of the front and rear faces of the lens and passing beside the zone of conflict Z1.

From this feeling, the processor means 700 deduce the three-dimensional coordinates of a plurality of points that belong to the front and rear 3D outlines but that lie outside the zone of conflict Z1. In order to calculate the three-dimensional coordinates of a plurality of points of these 3D outlines that are situated in the zone of conflict Z1, the processor means 700 perform a surface interpolation calculation taking account of the predetermined outline C1 in the plane D1 and of the coordinates of a plurality of points belonging to the curves C30.

For this purpose, the processor means determine an approximate function that is representative of the shape of each optical face of the lens. By way of example, this function may be of the following type:

$$z = a_0 + a_1 x + a_2 y + a_3 x^2 + a_4 xy + a_5 y^2$$

where x and y are the coordinates of a point in the plane D1 and z is its altitude relative to the plane D1.

The coefficients $a_0$, $a_1$, $a_2$, $a_3$, $a_4$, and $a_5$ are then determined by solving a system of equations devised using known three-dimensional coordinates of five points that have been felt on the curve C30.

Once the coefficients of the function have been defined, the two coordinates x, y (in the plane D1) of each point of the curve C20 make it possible to calculate an approximate value for the altitude z of that point.

The processor means 700 thus deduce the shapes of the front and rear 3D outlines. They can then calculate the thickness of the lens along the predetermined outline C1 so as to verify that it presents sufficient thickness to enable it to be shaped along the predetermined outline C1.

In a variant, the approximate function may be selected differently; it could in particular be of higher order. In another variant, the five points used for determining the coefficients of the above-mentioned function may be situated differently on the optical faces of the lens. For example they could be felt away from the curve C30, with the specific purpose of determining the coefficients of said function.

Step 2: Feeling Characteristic Points of the Lens

The processor means 700 then cause the turntable 102 and the feeler arm 301 to move so as to feel the blocking point P1 (boxing center) of the front face 21 of the ophthalmic lens L1, together with a plurality of points situated in the vicinity of the blocking point P1. This feeling serves to determine the height of the blocking point relative to the turntable 102, and also the orientation of the blocking axis (boxing axis).

If the lens is to be pierced for mounting a pierced type frame, the processor means 700 proceed in the same manner to determine the heights of the points for piercing relative to the turntable 102, and also the orientations of the piercing axes.

Step 3: Feeling the Second Lens

The processor means 700 then proceed in the same manner to feel the second ophthalmic lens L2 along its predetermined outline, and also to determine the level of its blocking point.

Blocking Operation

Step 0: Calibrating the Blocking Means

This calibration is generally performed at regular intervals while the preparation device 1 is not in use (i.e. in Step 1 of the loading operation). It is preferably performed using a dedicated blocking accessory 450 in position on a rod 160 of the turntable 102, with a contact face 452 that has no adhesive, or that presents adhesive presenting a small coefficient of adhesion.

During this step, the processor means 700 control the turntable 102 and the manipulator arm 401 in coordinated manner so as to place the blocking accessory 450 under the reception head 410 of the manipulator arm 401, in a "take-hold" position.

Thereafter, the processor means 700 control the top body 402 of the blocking means 400 to move in translation towards the turntable 102 so that the conical housing in the reception head 410 engages on the base 451 of the blocking accessory 450 and grips it. The top body 402 is then moved into the high position to separate the blocking accessory from the rod 160.

Thereafter, the processor means 700 cause the turntable 102 to pivot about its axis of rotation A1 so as to place its updating opening 150 in position for processing by the image acquisition device 200. The processor means also control the manipulator arm 401 so as to position the reception head 410 over the updating opening 150.

The processor means 700 then cause the top body 402 of the blocking means 400 to move towards the turntable 102 through the updating opening 150 so as to place the blocking accessory on the translucent screen of the image acquisition means 200 in a given setpoint position and with a given setpoint orientation (about its axis of revolution). The top body 402 is then caused to occupy its high position to take the manipulator arm 401 away from the field of the image acquisition device 200. In this position, the image acquisition device 200 takes a picture of the blocking member placed on the translucent screen.

The processor means 700 then acquire from said picture the real position and orientation of the blocking accessory 450. Thereafter, they determine the difference between the real position of the blocking accessory and its setpoint position, and the difference between the real orientation of the blocking accessory and its setpoint orientation. These differences serve to calibrate the blocking means 400.

In a variant, the processor means can repeat this operation by placing the blocking accessory 450 in a second setpoint position distinct from the first, and in a second setpoint orientation distinct from the first, and then calculate therefrom two other position and orientation differences. As a function of these two position and orientation differences, the processor means 700 can then determine two linear correspondence relationships causing each position and each orientation of the blocking accessory 450 to correspond to the two differences. These correspondence relationships thus enable the blocking means 400 to be calibrated as a function of the angular position of the manipulator arm 401 about the axis A4 and of the angular position of the reception head 410 about the axis A5.

In another variant, the processor means 700 can repeat this operation several times, placing the blocking accessory 450 in various locations on the translucent screen and in various orientations, in order to refine the correspondence relationships.

In any event, the processor means 700 acquire the real position(s) of the blocking accessory 450 from the picture by determining the positions of the openings 461 in the tongues 460 of the blocking accessory 450 relative to the outline of the updating opening 150.

In a variant, provision can be made for the blocking accessory that is dedicated to calibration to lack such tongues and to be oval in shape. In this variant, the processor means 700 then make use of the shape and/or the color of the blocking accessory in order to identify its position.

Typically, the processor means 700 determine the position and the orientation of the blocking accessory by calculating firstly the position of the center of gravity of the outline of the blocking accessory, and secondly the position of the longitudinal axis of said oval outline. In order to improve identification of this outline, provision can be made for the blocking accessory to be dark in color, e.g. black.

In a variant, provision can be made for the marker element of the blocking accessory to be formed by small dots stuck on said accessory, and presenting colors that are contrasted relative to the remainder of the blocking accessory.

Preliminary Step:

Once the centering of the job has been accepted by the optician and two blocking accessories 450 suitable for blocking the lenses has been identified, the processor means 700 precede to block the two lenses L1 and L2 of the job, i.e. to place a blocking accessory 450 on each of the lenses.

During a preliminary step, the processor means 700 verify that the optician has not forgotten to engage at least two blocking accessories 450 on the rods 160. To do this, the processor means 700 control the turntable 102 so as to place the portion of the turntable on which the rods 160 are located in the position for being processed by the image acquisition device 200. In this position, and as shown in FIG. 7, at least one tongue 460 of each blocking accessory 450 placed on the turntable 102 is visible to the image acquisition device 200 through the opening 109 in the turntable. The processor means 700 can thus verify that blocking accessories are present and can verify that they are properly positioned and oriented on the rods 160.

In a variant, each blocking accessory may be pierced axially by a through opening into its contact face. This opening is then normally closed by the adhesive of the blocking accessory. Naturally, if the accessory unfortunately does not have adhesive, then the opening is visible to the acquisition device. In this way, the processor means are capable of identifying the opening and of detecting this anomaly. Under such circumstances, the processor means control the turntable to take up the loading position so that the optician can change the blocking accessories.

Step 1: Taking Hold of a Blocking Accessory

Thereafter, the processor means 700 control the turntable 102 to place one of the selected blocking accessories 450 under the reception head 410 of the manipulator arm 401 in the "take-hold" position. The take-hold position is obtained by combining the freedoms of movement in rotation of the turntable 102 and of the manipulator arm 401 so that the reception head 410 is placed vertically in register with the blocking accessory 450.

Thereafter, the processor means 700 cause the top body 402 of the blocking means 400 to move in translation towards the turntable 102 so that the conical housing in the reception head 410 engages on the base 451 of the blocking accessory 450 in order to grip it. The top body 402 is then caused to take up its high position so as to separate the blocking accessory from the rod 160 that initially supported it.

Step 2: Identifying the Position of the Manipulator Arm

The processor means 700 control the turntable 102 to pivot about its axis of rotation A1 so as to place the calibration opening 130 adjacent to the first reception location 110 in position for processing by the image acquisition device 200. The processor means also cause the blocking means 400 to place the reception head 410 of the manipulator arm 401 in the blocking position.

The blocking position of the reception head 410 corresponds to the position in which it is located when the blocking accessory 450 is put down on the ophthalmic lens L1. This position is calculated as a function of the coordinates of the blocking point P1 as felt and of the cylinder axis and/or of the polarization direction of the lens. In this way, in the blocking position, the pivot point P3 of the reception head 410 is situated at the same height relative to the turntable 102 as is the blocking point P1. Furthermore, in the blocking position, the blocking accessory 450 presents an angular position around the axis A5 (FIG. 5) that makes it possible to place the blocking accessory with the correct orientation relative to the orientation of the lens. Once these setpoint positions of the turntable 102 and of the reception head 410 have been reached, the image acquisition device 200 takes a picture of the manipulator arm 401 and of the various marker elements of the arm and of the blocking accessory.

Thereafter, the processor means 700 determine the real angular positions of the manipulator arm 401 about its axis of rotation A4 and of the reception head about its axis A5 (FIG. 5) as a function of the positions of the openings 411, 412 in the collar 415 of the reception head 410. The processor means then compare these real positions with the setpoint positions and deduce a difference therefrom. If this difference is greater than a predetermined threshold value, they correct the position of the manipulator arm 401 and of the reception head 410 relative to the turntable 102.

In a variant, if this difference is greater than a predetermined threshold value, the positions of the manipulator arm 401 and of its reception head 410 relative to the turntable 102 are not corrected, but the difference is sent to the device for machining the lens. The centering error due to this difference is then taken into account by the device for shaping the lens. In this variant, the blocking accessory is thus not exactly positioned on the blocking point P1 of the lens, but on the contrary it is offset therefrom.

Furthermore, the processor means 700 verify the presence and the correct positioning of the blocking accessory 450 on the manipulator arm 401. For this purpose, they determine the position in the picture of the images of the tongues 460 of the blocking accessory 450 as seen through the windows 413 in the collar 415. These positions provide the processor means 700 with the position of the gripped blocking accessory 450, which position is supposed to correspond with the previously-determined position of the manipulator arm 401. If so, then the processor means 700 deduce that not only has the accessory actually been gripped, but also that it is correctly positioned on the reception head 410.

Once the blocking accessory 450 is correctly gripped and the blocking means 400 are suitably positioned, the processor means 700 cause the manipulator arm 401 to move in translation vertically towards the top of the preparation device 1, while ensuring that the angular positions of the manipulator arm 401 and of the reception head 410 about their respective axes of rotation A4 and A5 do not vary.

In a variant, while the blocking means 400 are being put into place facing the image acquisition device 200, the processor means 700 can control the blocking means 400 so that the reception head 410 of the manipulator arm 401 is in the blocking position in the plane of the turntable 102, and so that the blocking means remain spaced apart from the turntable 102 by a height such that, should the turntable turn, said blocking means do not come into collision with the turntable 102.

In this variant, the picture taken of the manipulator arm 401 makes it possible to determine and correct the position of the blocking head and the position of the blocking accessory 450 while they are vertically spaced apart from their blocking positions.

If the axes of rotation A1 and A4 of the turntable 102 and of the manipulator arm 401 are strictly parallel, then there is no need for any additional correction of the position of the blocking arm. However, it will be understood that if these axes are not exactly parallel, then lowering the manipulator arm 401 into the blocking position will give rise to the arm being offset relative to the turntable.

In this variant, while the preparation device is not in use (Step 1 of the loading operation), the processor means 700 act at regular intervals to calibrate the position of the axis of rotation A4 of the arm relative to the turntable 102. For this purpose, the processor means take two picture of the collar 415 of the manipulator arm 401 while it occupies two different heights, and they deduce therefrom said angle between non-parallel axes. Given this angle, the processor means 700 can then correct the position of the blocking arm so as to take account of the axes not being parallel.

Step 3: Placing the Blocking Accessory on the Lens

Initially, the turntable 102 is operated to bring the first reception location 110 into position for processing by the acquisition device, so that the blocking point of the lens is situated under the blocking accessory 450. In order to verify that its new position corresponds to the setpoint position, the image acquisition device 200 takes a picture of the reception location 110 and of its openings 111. From this picture, the processor means 700 deduce the angular position of the turntable 102 about its axis of rotation A1, and consequently the angular position of the lens. This angular position is compared with the angular position stored in the mass memory at the end of the centering operation. If the angular difference between these two positions does not correspond to the desired difference (representative of the motor for driving the turntable 102 losing a step), then the processor means 700 correct the position of the turntable 102 so as to position the ophthalmic lens L1 accurately in the blocking position.

In a second stage, the processor means 700 cause the manipulator arm 401 to move vertically in translation towards the turntable 102, while ensuring that the angular position of the manipulator arm 401 and of the reception head about their respective axes of rotation A4 and A5 do not vary. This movement in translation is initially fast (greater than 20 millimeters per second), after which it becomes slow (less than 5 millimeters per second) when the blocking accessory 450 comes close to the lens (less than 2 millimeters from the blocking point P1 of height that is known).

The contact face of the blocking accessory 450 then presses accurately against the front face 21 of the lens given the two freedoms of movement in rotation of the reception head 410, such that the adhesive of the contact face adheres firmly to the lens.

Finally, in a third stage, the processor means 700 cause the manipulator arm 401 to move in vertical translation towards the top of the preparation device 1 along an axis parallel to the axis of rotation A1 of the turntable 102 so as to disengage the base 451 of the blocking accessory 450 from the conical housing in the reception head 410. The conical shapes of the base 451 and of the housing ensure that raising the reception head 410 does not give rise to any transverse force on the base 451 of the blocking accessory, which would run the risk of shifting the base away from the blocking point P1. On the contrary, as soon as upward movement begins, the entire side surface of the housing separates from the side surface of the base, even if the accessory is inclined as a result of the curvature of the lens.

Step 4:

Nevertheless, it can happen that at the end of this step of placing the blocking accessory 450 on the ophthalmic lens L1, and in spite of the care given to this operation, that the blocking accessory 450 is not situated exactly in register with the blocking point P1 and/or that it does not present the desired orientation (about its axis of revolution). This offset may be due to unwanted movements of the members of the preparation device 1 during or after the placing of the blocking accessory, or indeed to difficulty in separating the base 451 of the blocking accessory 450 from the conical housing in the reception head 410.

To remedy this problem, provision can be made for the electronic and/or computer processor means 700 to identify a position error between the point P1 and the real position of the center of the contact face 452 of the blocking accessory 450 placed on the ophthalmic lens L1, and an angular error between the real orientation and the setpoint orientation for said blocking accessory, and then the processor means compare these identified differences with predetermined thresholds.

In this example, the thresholds are stored in the mass memory of the electronic and/or computer processor means 700 and they comprise a distance value, equal to 0.5 millimeters in this example, and an angle value, equal to 2 degrees in this example.

Thereafter, if the electronic and/or computer processor means 700 determine that one or other of the identified differences is greater than the correspond threshold, the electronic and/or computer processor means 700 generate a warning message. More precisely, they display a warning message on the display screen 600, advising the operator to stop the preparation of the job and to reinitialize it.

In contrast, if the two identified differences are less than the predetermined thresholds, or if the operator does not stop preparation of the job, then the electronic and/or computer processor means 700 prepare for the machining of the ophthalmic lens L1 by generating a signal that includes data relating to said identified errors, and the process of preparing the job continues (see Step 5).

The device for digitally machining the lenses of the job then makes use of this signal.

More precisely, the preparation device 1 includes communications means suitable for communicating with corresponding communications means of the machining device, the processor means 700 sending the signal to the machining device via said communications means.

The machining device is well known to the person skilled in the art and does not form the subject matter of the present invention. One example of such a device is described in document U.S. Pat. No. 6,327,790 or is sold by the Applicant under the trademark Kappa CTD, for example.

That device includes shafts for holding an ophthalmic lens and for driving it in rotation about a blocking axis, and a machine tool (such as a grindwheel) mounted to rotate about an axis parallel to the blocking axis of the lens. The machining device further includes means for controlling the freedoms of the shafts and the machining tool to move in particular so as to control the radial spacing between the machining tool and the blocking axis in each angular position of the lens around the blocking axis, said spacing being caused to comply with a given control setpoint.

The control setpoint is generally generated by the control means as a function of the shapes of the rims of the eyeglass frame selected by the wearer of the lenses that are to be machined. In this example, this control setpoint is also generated as a function of the signal transmitted by the preparation device 1, i.e. as a function of the identified distance and orientation differences. The control setpoint is more particularly corrected so as to compensate for these identified differences.

Step 5:

In any event, once the blocking accessory 450 has been stuck on the first lens, the processor means 700 perform above-described Steps 1 to 4 again so as to place another blocking accessory on the second ophthalmic lens L2. In contrast, during Step 2, the processor means 700 control the turntable 102 to pivot about its axis of rotation A1 so as to place the calibration opening 131 that is adjacent to the second reception location 120 as opposed to the opening adjacent to the first reception location 110 in position for processing by the image acquisition device 200. The use of this calibration opening 131 enables time to be saved when pivoting the turntable 102 since this opening 131 is close to the second reception location 120.

Unloading Operation

The turntable 102 is then controlled to bring the reception locations 110, 120 into register with the access door 501 in the loading zone 12. The clamping jaws 115, 125 are then controlled to take up the open position so that the optical lenses L1, L2 are resting on the seats 11.

Thereafter, the access door 501 opens automatically so as to allow the optician to recover the job.

The lenses L1, L2 fitted with their blocking accessories 450 are then suitable for being positioned by the optician in the shaper device, between its chucks for gripping the lenses. The position of the blocking accessory and its orientation in the plane D1 of the lens then enables the shaper device to be aware of the frame of reference of the lens, and thus to determine the position of the determined outline C1 on the lens.

The invention claimed is:

1. A preparation device (1) for preparing an ophthalmic lens (L1, L2) to be machined, the device comprising:
   a support (100) suitable for holding said ophthalmic lens (L1, L2);
   blocking means (400) including at least one blocking accessory (450) and a manipulator arm (401) for manipulating said blocking accessory (450);

an acquisition device (200) suitable for acquiring an image (601) of the ophthalmic lens (L1, L2) held by the support (100); and processor means (700) suitable firstly for deducing an optical frame of reference of the ophthalmic lens (L1, L2) from the image (601) acquired by the acquisition device (200), and secondly for controlling the position of at least one of the manipulator arm (401) and the support (100) to apply said blocking accessory (450) against the ophthalmic lens (L1, L2) in a given blocking position (P1) that depends on the deduced optical frame of reference;

wherein at least one of the blocking means (400) and the support (100) includes at least one marker element (101, 111, 121, 411, 412, 461), and in that the processor means (700) are adapted to identify the position of said marker element (101, 111, 121, 411, 412, 461) in an image (601) acquired by the acquisition device (200) and in which there appears an image of said marker element (101, 111, 121, 411, 412, 461).

2. The device according to claim 1, wherein the processor means (700) are adapted to determine at least one of the real position of the manipulator arm (401) and the position of the support (100) as a function of the identified position of the marker element (101, 111, 121, 411, 412, 461).

3. The device according to claim 2, wherein the processor means (700) are adapted firstly to identify a difference between said real position and a setpoint position for the manipulator arm (401) relative to the support (100), and secondly to prepare for machining of the ophthalmic lens (L1, L2) by generating a signal that includes data relating to said identified difference, the preparation device (1) including communications means for communicating with a machining device and suitable for conveying said signal.

4. The device according to claim 2, wherein the processor means (700) are adapted to control the position of at least one of the manipulator arm (401) and the support (100) to apply said blocking accessory (450) on the ophthalmic lens (L1, L2) by means of a control loop that, at each instant, is a function of the identified position of the marker element (101, 111, 121, 411, 412, 461).

5. The device according to claim 4, wherein the processor means (700) are adapted firstly to identify a difference between said real position and a setpoint position for at least one of the manipulator arm (401) and the support (100), and secondly to control the position of at least one of the manipulator arm (401) and the support (100) as a function of said identified difference.

6. The device according to claim 1, wherein both the blocking means (400) and the support (100) are movable, and are controlled in position by the processor means (700), each of them including at least one marker element (101, 111, 121, 411, 412, 461).

7. The device according to claim 1, wherein the acquisition device (200) is suitable for acquiring an image (601) of at least a portion of the manipulator arm (401), and wherein the manipulator arm (401) includes at least three marker elements (411, 412) positioned relative to one another in such a manner that the images of at least two marker elements (411, 412) appear in said acquired image (601).

8. The device according to claim 1, wherein the support (100) is movable relative to a base structure (10) and is provided with a marker element (101, 111, 121) of the above-specified type, and the acquisition device (200) is suitable for acquiring in succession, for two distinct positions of the support (100), two images (601) of at least a portion of the support (100) and of said marker element (101, 111, 121), and the processor means (700) are suitable for deducing the position of the support (100) relative to the base structure (10) from the two successive positions of said marker element (101, 111, 121).

9. The device according to claim 1, wherein, the support (100) is movable relative to a base structure (10) and is provided with two marker elements (101, 111, 121) of the above-specified type, and the acquisition device (200) is suitable for acquiring an image (601) of at least a portion of the support (100) and of said marker element (101, 111, 121), and the processor means (700) are suitable for deducing the position of the support (100) relative to the base structure (10) from the positions of said marker elements (101, 111, 121).

10. The device according to claim 1, wherein at least one of the manipulator arm (401) and the support (100) include at least two marker elements (101, 111, 121, 411, 412) presenting distinct geometrical shapes.

11. The device according to claim 1, wherein said marker element (101, 111, 121, 411, 412, 461) comprises a through opening.

12. The device according to claim 1 wherein the blocking accessory (450) is provided with said marker element (460) and wherein the processor means (700) are suitable firstly for detecting the presence or the absence of said marker element (460) as a function of the image (601) acquired by the acquisition device (200), and secondly for deducing therefrom the presence or the absence of said blocking accessory (460) on the manipulator arm (401).

13. The device according to claim 12, wherein the manipulator arm (401) includes at least one window (413), and said marker element of the blocking accessory (450) includes at least one tongue (460) such that the image thereof acquired by the acquisition device (200) darkens at least a portion of the image of the window (413) when the blocking accessory (450) is properly positioned on the manipulator arm (401).

14. The device according to claim 1, wherein the blocking accessory (450) is disposed on the support (100) and includes a marker element (460) of the above-specified type, and the acquisition device (200) is suitable for acquiring an image (601) of at least a portion of the turntable and of said blocking accessory (450), with the processor means (700) being suitable firstly for detecting the presence or the absence of said marker element (460) as a function of the acquired image (601), secondly for deducing therefrom the presence or the absence of said blocking accessory (450) on the support (100), and thirdly for determining the position of said blocking accessory (450) relative to the support (100).

15. The device according to claim 1, wherein said marker element (460) forms part of the blocking accessory (450).

16. The device according to claim 15, wherein the processor means (700) are adapted firstly to identify at least one of a distance and angle difference between a real position of the blocking accessory (450) applied to the ophthalmic lens (L1, L2) and a setpoint position, and secondly to generate a signal including data relating to said identified difference, the preparation device (1) including communications means suitable for transmitting said signal to corresponding communications means of a digital machining device suitable for machining the ophthalmic lens (L1, L2) as a function of said transmitted signal.

17. The device according to claim 15, wherein the processor means (700) are adapted firstly to identify at least one of a distance and angle difference between the real position of the blocking accessory (450) applied to the ophthalmic lens (L1, L2) and a setpoint position, secondly to compare said identified difference with a predetermined threshold, and thirdly, if said identified difference is greater than said predetermined threshold, to generate a warning message.

18. The device according to claim 1, wherein the support (100) includes a plurality of reception locations (110, 120) for receiving ophthalmic lenses (L1, L2), each of which is associated with a marker element (111, 121) of the above-specified type, the support (100) and the acquisition device (200) being movable relative to each other to position each reception location (110, 120) in succession in a position for processing by the acquisition device (200), in which position said marker element (111, 121) associated with said reception location (110, 120) appears in the image (601) acquired by the acquisition device (200).

19. The device according to claim 18, including a loading zone (12) accessible to a user and provided with at least one seat (11) for supporting an ophthalmic lens (L1, L2) while it is being loaded into or unloaded from one of the reception locations (110, 120), each reception location (110, 120) presenting a recess and each seat (11) carrying a polarized coating or illumination visible to the user through the recess in the corresponding reception location (110, 120).

20. The device according to claim 18, wherein the support (100) includes an updating opening (150) and wherein the processor means (700) are suitable for controlling the support (100) to take up a rest position in which the reception locations (110, 120) are situated in a loading zone (12) accessible to a user, and in which position the updating opening (150) is in position for being processed by the acquisition device (200).

21. The device according to claim 18, wherein both the blocking means (400) and the support (100) are movable, and are controlled in position by the processor means (700), each of them including at least one marker element (101, 111, 121, 411, 412, 461, and each reception location (110, 120) of the support (100) is adjacent to a calibration opening (130, 131) passing through the support (100), and wherein the processor means (700) are adapted firstly to control the manipulator arm (401) relative to the support (100) so as to place said calibration opening (130, 131) and the manipulator arm (401) in a position for processing by the acquisition device (200), and secondly to determine the position of each marker element (411, 412) of the manipulator arm (401) as a function of the image acquired by the acquisition device (200).

22. The device according to claim 1, wherein the support (100) is provided with said marker element (101, 111, 121), wherein at least one feeler arm (301) is provided for feeling the ophthalmic lens (L1, L2) held by the support (100), and wherein the processor means (700) are adapted to control the position of the feeler arm (301) relative to the support (100) as a function of the determined position of said marker element (101, 111, 121) of the support (100).

23. The device according to claim 1, wherein:
at least one feeler arm (301) is provided for feeling the ophthalmic lens (L1, L2);
the support (100) includes permanent calibration paths (140); and
the processor means (700) are suitable firstly for controlling the position of the feeler arm (301) relative to the support (100) to cause it to feel said calibration paths (140), and secondly to deduce from said feeling parameters for calibrating the relative position of the feeler arm (301).

24. The device according to claim 23, wherein at least one of the calibration paths (140) is provided with a marker element (143) of the above-specified type, and wherein the processor means (700) are suitable firstly for controlling the support (100) to position said calibration path (140) in a position for processing by the acquisition device (200), and secondly for deducing at least some of said calibration parameters from the image (601) acquired by the acquisition device (200).

25. The device according to claim 23, wherein the support (100) presents freedom of movement in pivoting about an axis of rotation (A1), and said calibration paths (400) comprise at least two non-parallel rectilinear grooves (141) situated in a plane orthogonal to said axis of rotation (A1) and a plane (142) that slopes relative to said axis of rotation (A1).

26. The device according to claim 23, wherein the support (100) and the feeler arm (301) present freedoms of movement in pivoting about distinct axes of rotation (A1, A2), said calibration parameters including at least one of the following parameters:
a non-parallel angle between the axes of rotation (A1, A2) of the support (100) and of the feeler arm (301);
a first correction distance between a theoretical spacing stored in the processor means (700) and a real spacing between the axes of rotation (A1, A2) of the support (100) and of the feeler arm (301);
an offset angle between a theoretical angular position stored in the processor means (700) and a real angular position of the feeler arm (301) about its axis of rotation (A2); and
a second correction distance between a theoretical radius stored in the processor means (700) and a real radius between the axis of rotation (A2) of the feeler arm (301) and a feeler end (302) of the feeler arm (301).

27. The device according to claim 22, wherein the processor means (700) are suitable for:
detecting one or more zones of conflict (Z1, Z2) on the ophthalmic lens (L1, L2) held by the support (100), in each of which zones there is a risk of the feeler arm (301) coming into conflict against a member (115, 125) of the support (100);
controlling the position of the feeler arm (301) relative to the support (100) to feel at least one optical face (21, 22) of said ophthalmic lens (L1, L2) except in said zone of conflict (Z1, Z2), the feeler arm (301) being controlled in position in a mean plane (D1) of the ophthalmic lens (L1, L2) to follow a predetermined outline (C1) in said mean plane (D1) while also being simultaneously urged against said optical face (21, 22) of the ophthalmic lens (L1, L2) in a direction (A3) extending substantially transversely relative to said mean plane (D1);
acquiring the coordinates of a plurality of points of the predetermined outline (C1) that do not lie in said zone of conflict (Z1, Z2); and
calculating the coordinates of a plurality of points of the predetermined outline (C1) that lie within said zone of conflict (Z1, Z2), while taking account at least of the shape of the predetermined outline (C1) in the mean plane (D1) and of the coordinates of points felt on said optical face (21, 22) of the ophthalmic lens (L1, L2).

28. The device according to claim 1, wherein said blocking accessory (450) is manipulated by the manipulator arm (401) and presents a contact face (452) suitable for pressing against the ophthalmic lens (L1, L2) held by the support (100), and the manipulator arm (401) comprises an elongate body (420) and a reception head (410) for receiving the blocking accessory (450), said reception head (410) being connected to the elongate body (420) via a ball joint presenting one freedom of movement in rotation under the control of the processor means (700) and two unconstrained freedoms of movement in rotation freely about a pivot point (P3) situated on said contact face (452).

29. The device according to claim 28, wherein the reception head (410) includes a conical bore diverging towards its mouth and each blocking accessory (450) includes a converging conical base (451) engageable in the diverging conical bore of the reception head (410).

30. The method of preparing an ophthalmic lens (L1, L2) by means of a preparation device (1) according to claim 21, the method comprising the steps of:
 a) controlling the support (100) to place one of the reception locations (110, 120) in position for processing by the acquisition device (200); then
 b) acquiring a first image of the ophthalmic lens (L1, L2) held in said reception location (110, 120) and of the marker element (111, 121) of said reception location (110, 120);
 c) controlling the positions of the manipulator arm (401) and of the support (100) to place the calibration opening (130, 131) adjacent to said reception location (110, 120) and the manipulator arm (401) in a position for being processed by the acquisition device (200); then
 d) acquiring an image of the manipulator arm (401) and of the marker element (411, 412) of said manipulator arm (401);
 e) identifying a difference between a setpoint position for the manipulator arm (401) and its real position as deduced from the position of the image acquired of the marker element (411, 412) of the manipulator arm (401);
 f) controlling the position of the support (100) to bring said reception location (110, 120) into a position for being processed by the acquisition device (200);
 g) acquiring a second image of the ophthalmic lens (L1, L2) held in said reception location (110, 120) and of the marker element (111, 121) of said reception location (110, 120);
 h) identifying a difference between a setpoint position for the support (100) and its real position deduced from the positions of the first and second images acquired of the marker element (111, 121) of said reception location (110, 120); and finally
 i) controlling the manipulator arm (401) to move towards the support (100) to apply said blocking accessory (450) against the ophthalmic lens (L1, L2).

* * * * *